(12) United States Patent
Wang

(10) Patent No.: US 8,366,449 B2
(45) Date of Patent: Feb. 5, 2013

(54) METHOD AND SYSTEM FOR KNOWLEDGE DIAGNOSIS AND TUTORING

(75) Inventor: Chi Wang, Carmel, IN (US)

(73) Assignee: Chi Wang, Carmel, IN (US)

( * ) Notice: Subject to any disclaimer, the term of this patent is extended or adjusted under 35 U.S.C. 154(b) by 859 days.

(21) Appl. No.: 12/190,748

(22) Filed: Aug. 13, 2008

(65) Prior Publication Data

US 2010/0041007 A1    Feb. 18, 2010

(51) Int. Cl.
    *G09B 3/01*   (2006.01)
(52) U.S. Cl. ........ 434/322; 434/365; 434/156; 434/319; 434/308; 273/429
(58) Field of Classification Search .................. 434/350, 434/273, 365, 156, 308, 319; 273/429
    See application file for complete search history.

(56) References Cited

U.S. PATENT DOCUMENTS

| | | | |
|---|---|---|---|
| 6,554,618 B1* | 4/2003 | Lockwood | 434/322 |
| 2004/0219504 A1* | 11/2004 | Hattie | 434/353 |
| 2007/0111183 A1* | 5/2007 | Krebs et al. | 434/350 |
| 2010/0068688 A1* | 3/2010 | Shapiro | 434/350 |

* cited by examiner

*Primary Examiner* — Xuan Thai
*Assistant Examiner* — Banafsheh Hadizonooz
(74) *Attorney, Agent, or Firm* — Barnes & Thornburg LLP; Glen M. Kellett

(57) ABSTRACT

The present invention includes method and system for intelligent knowledge diagnosis and tutoring in any knowledge domain. It differs from prior arts with new knowledge model for knowledge presentation and heuristic algorithms. The knowledge model allows the present invention to be applied to curricula in different knowledge domains quickly and cost effectively.

The knowledge model and related computational algorithms provide effective and intelligent knowledge diagnosis and tutoring with minimum requirement on assessment content and learning content. It also allows easy curriculum customization and learner initiated learning assistance to meet needs of different teaching and learning styles.

The present invention gains better understanding of learner's knowledge status and hence provides more accurate assistance as learner progresses in the curriculum. The present invention can be an add-engine to existing learning management systems working with existing assessment and learning content in any format.

32 Claims, 24 Drawing Sheets

Direct prerequisite relationships among knowledge points

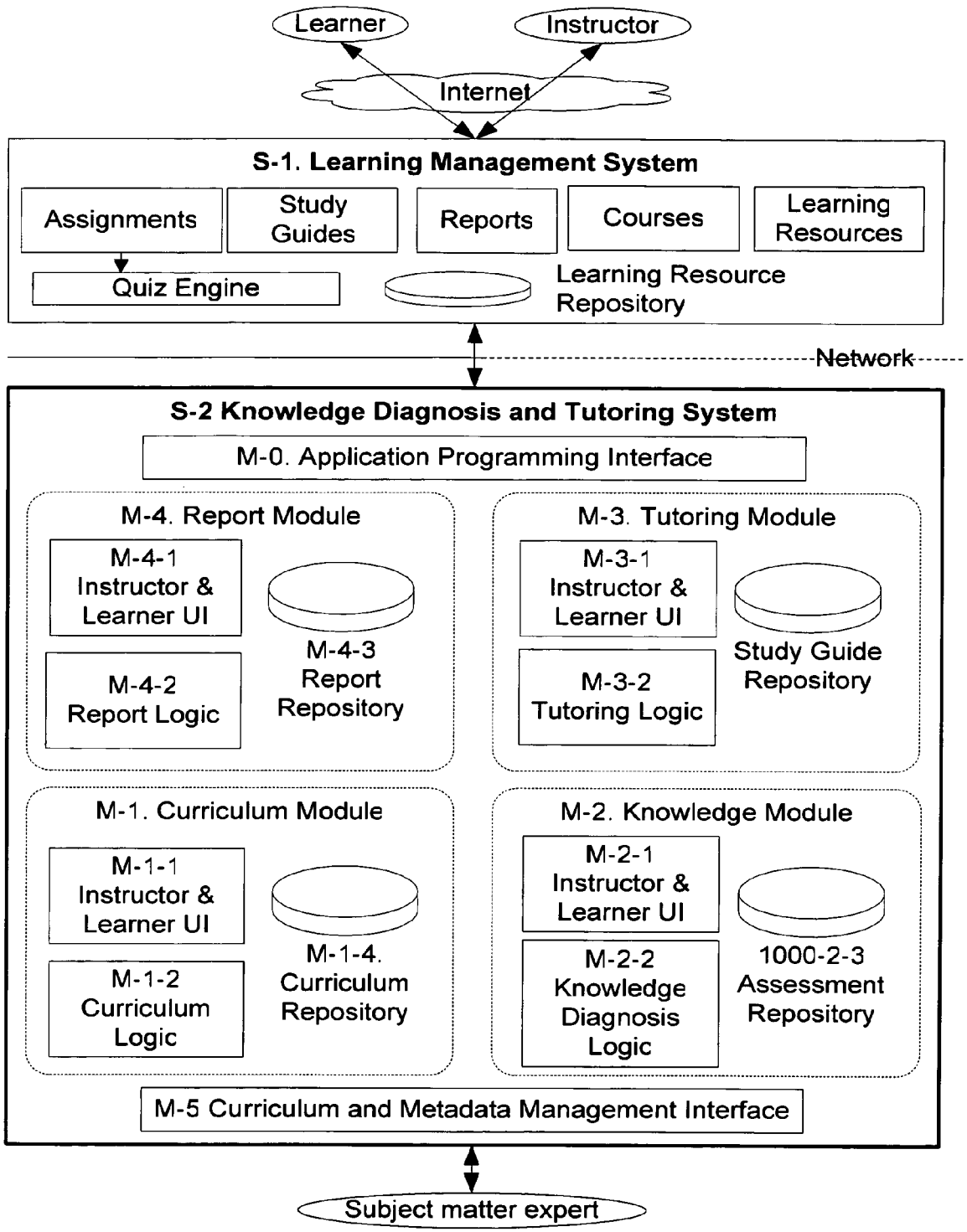
Figure 1 Overview

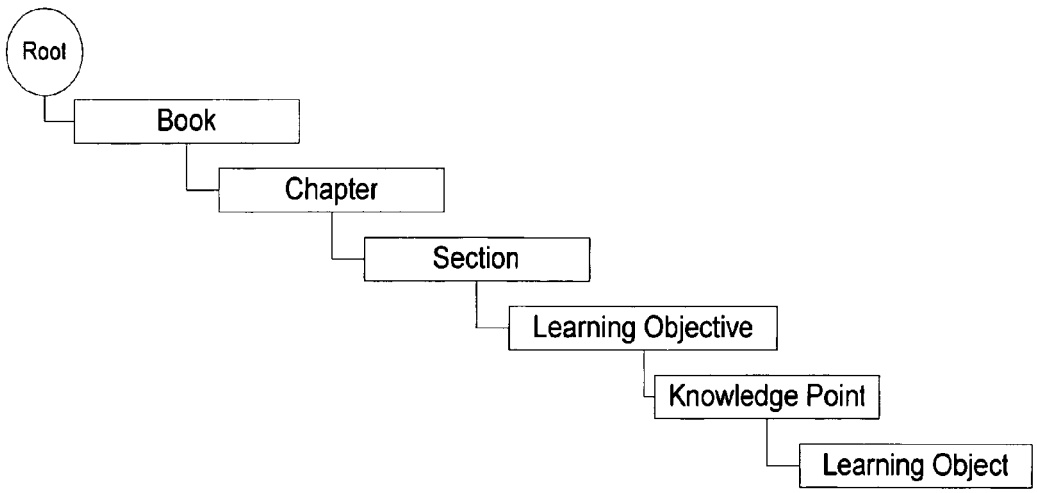

Figure 2 Sample content taxonomy category

| Level | Category | Term |
|---|---|---|
| 1 | Book | TOC, TOF |
| 2 | Chapter | Forward, Preface, Acknowledgement, Introduction, Chapter, Appendix, Cross-Reference |
| 3 | Section | Section, Conclusion, End-of-Chapter |
| 4 | Learning Objective | Learning Objective |
| 5 | Knowledge Point | Knowledge Point |
| 6 | Learning Object | Definition, Conclusion, Example, Online-Video, Use-Calculator, Animation, Figure-Callout, Table-Callout |

Figure 3 Sample category terms of a content taxonomy

Learning Objective: Solving One Variable Linear Equation

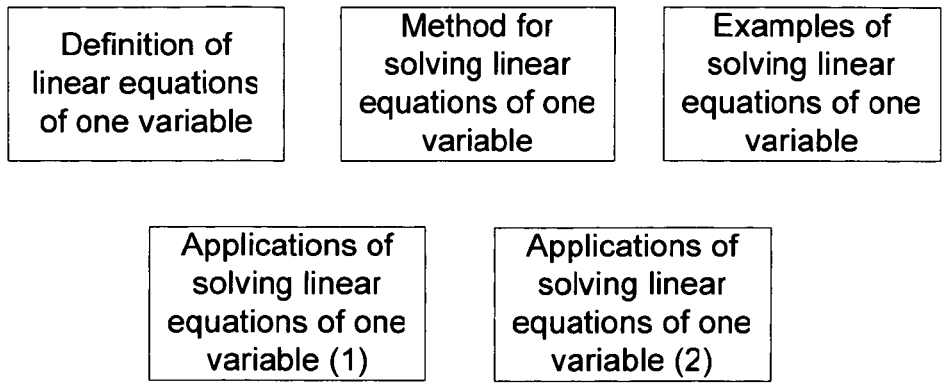

Figure 4 Knowledge points of a learning objective

| Level | Category | Terms |
|---|---|---|
| 1 | Knowledge | Definition, description, identify, recognition, knowledge, list, matches, method |
| 2 | Comprehension | Comprehension, conversion, distinguishing, estimate, explanation, interpretation, example, summary |
| 3 | Application | Application, change, computation, construction, operation, solving |
| 4 | Analysis | Analysis, partition, comparison, contradiction, separation |
| 5 | Synthesis | Categorization, combination, explanation, reorganization, summary, design, creation |
| 6 | Evaluation | Appraisal, compare, conclusion, evaluation, justification, relation, support |

Figure 5 Sampe pedagogic categories and their terms

| Knowledge Point | Category | Terms |
|---|---|---|
| Example of solving linear equation of one variable | Application | Solving, computation |
| | Comprehension | Comprehension |
| | Knowledge | Recognition, method |

Figure 6 Pedagogic categories and associate term of a knowledge point

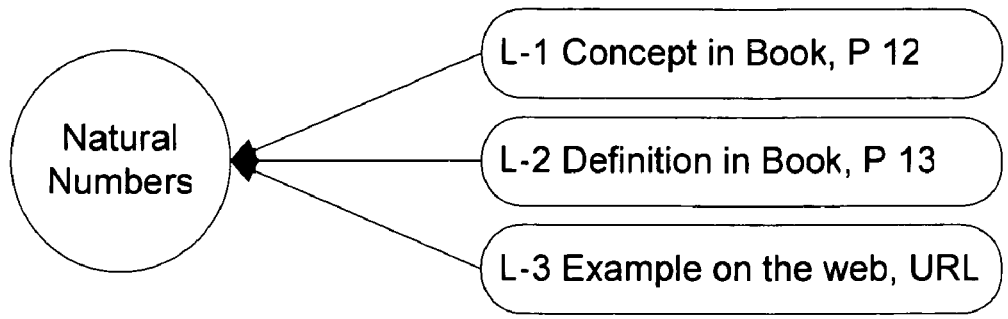
Figure 7 Learning Resources of a knowledge point
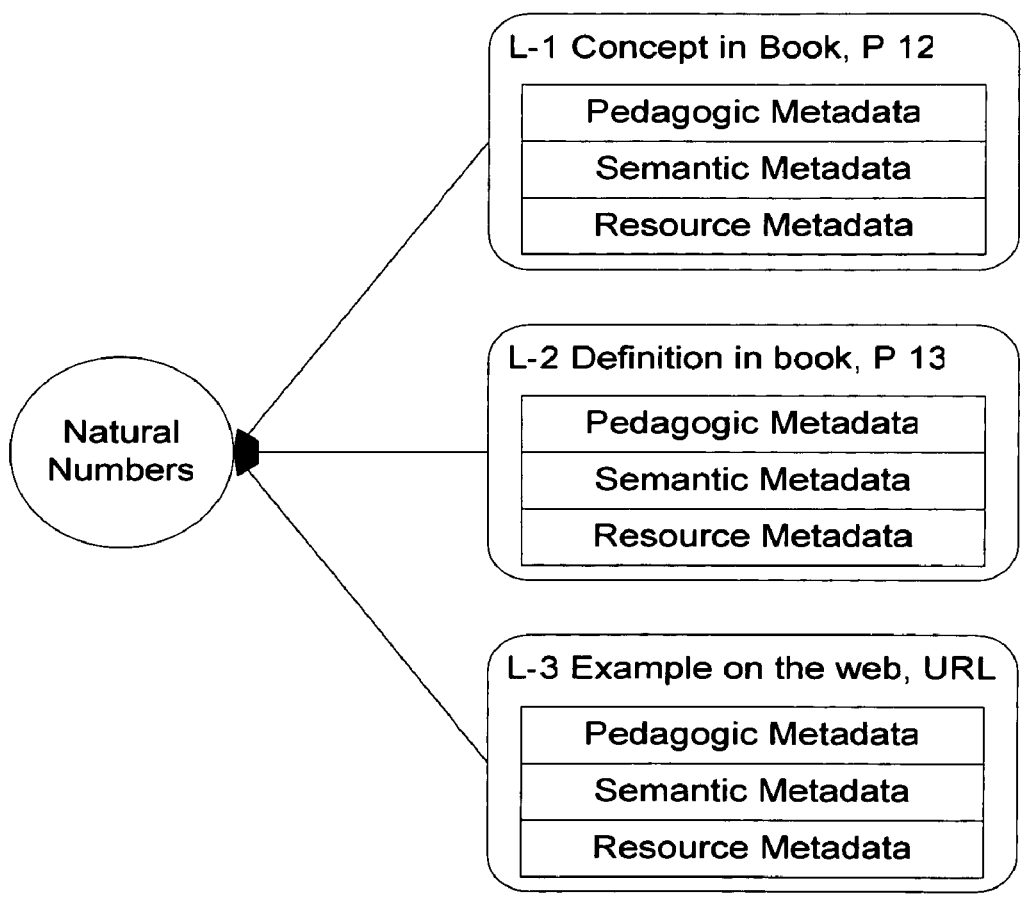
Figure 8 Metadata associated with learning resources

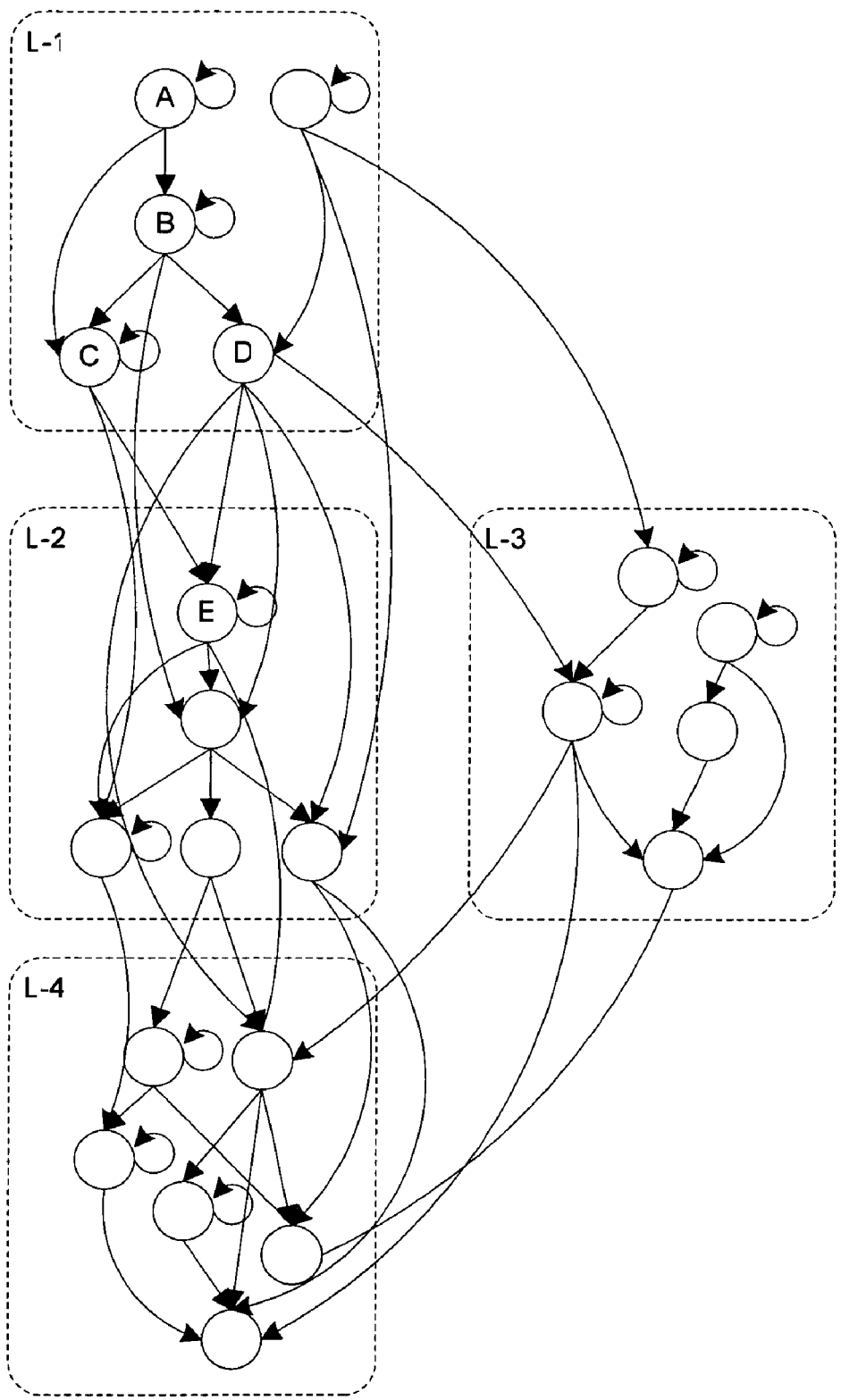
Figure 9 Direct prerequisite relationships among knowledge points

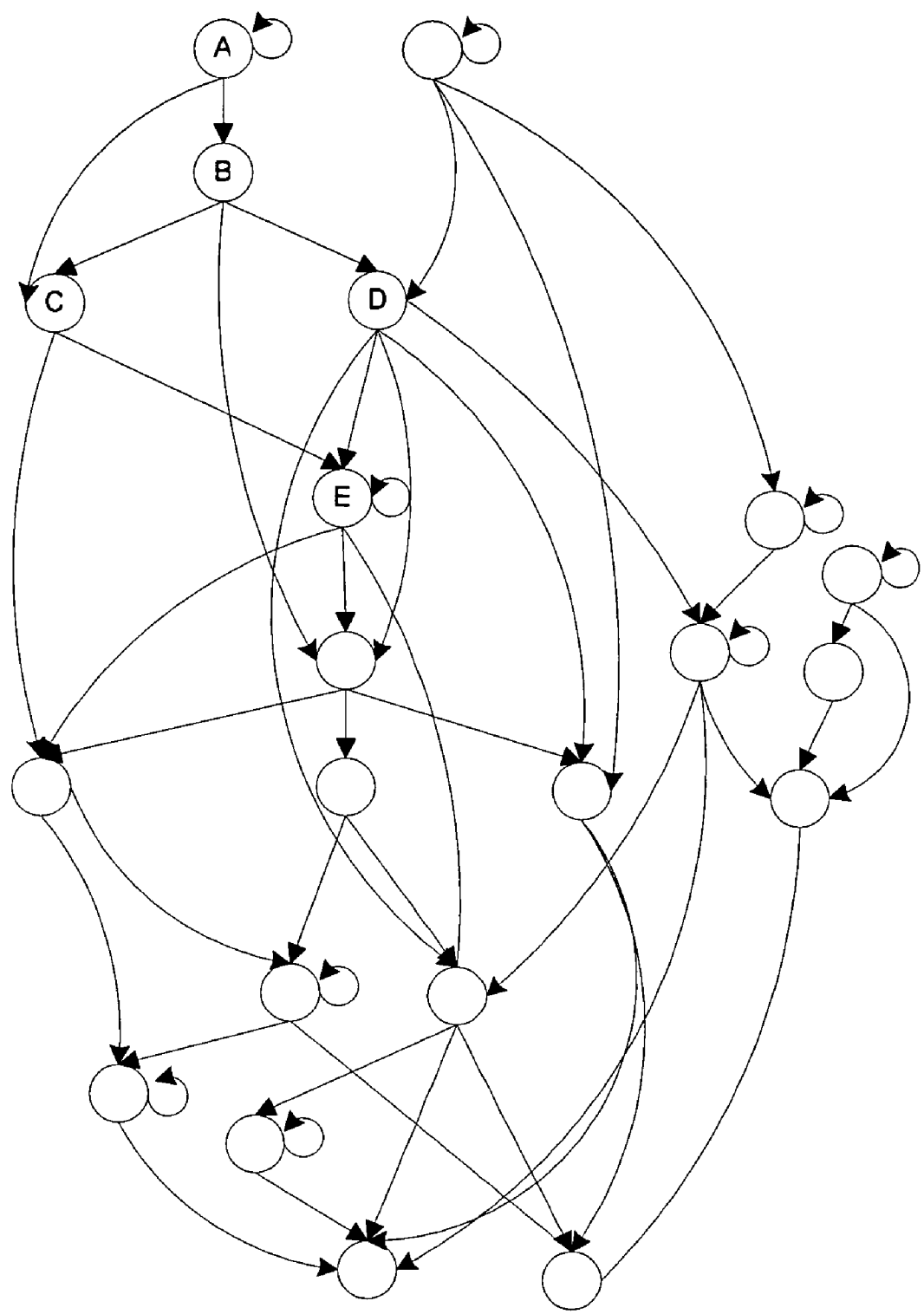
Figure 10 Example of prerequisite digraph

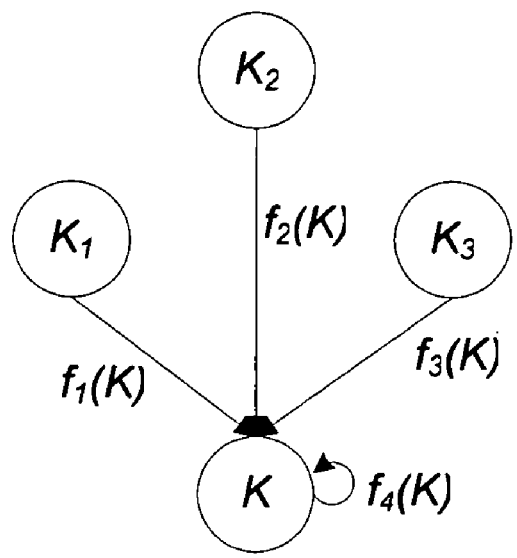
Figure 11 Knowledge prerequisite distribution
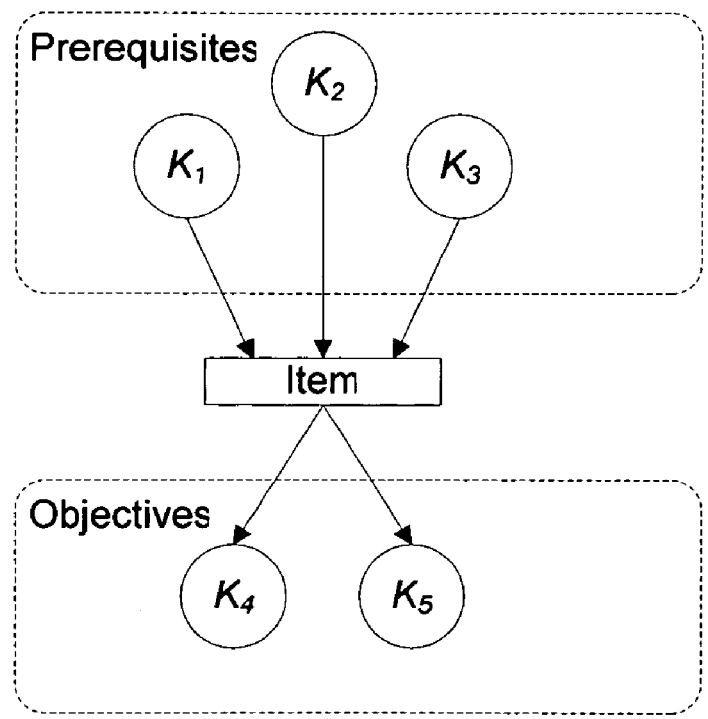
Figure 12 Objectives and prerequisites of an assessment item

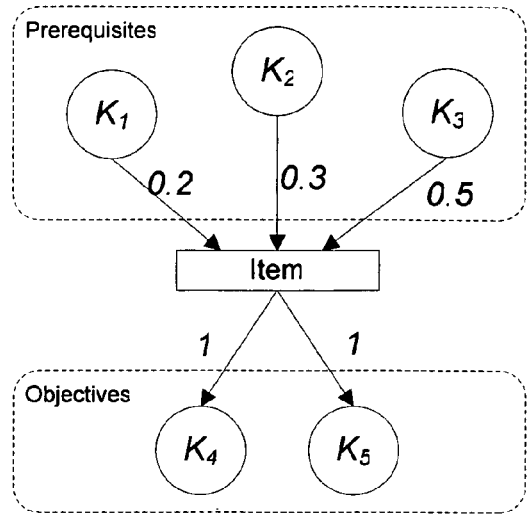
Figure 13 Objective scalars and prerequisite distribution of an item
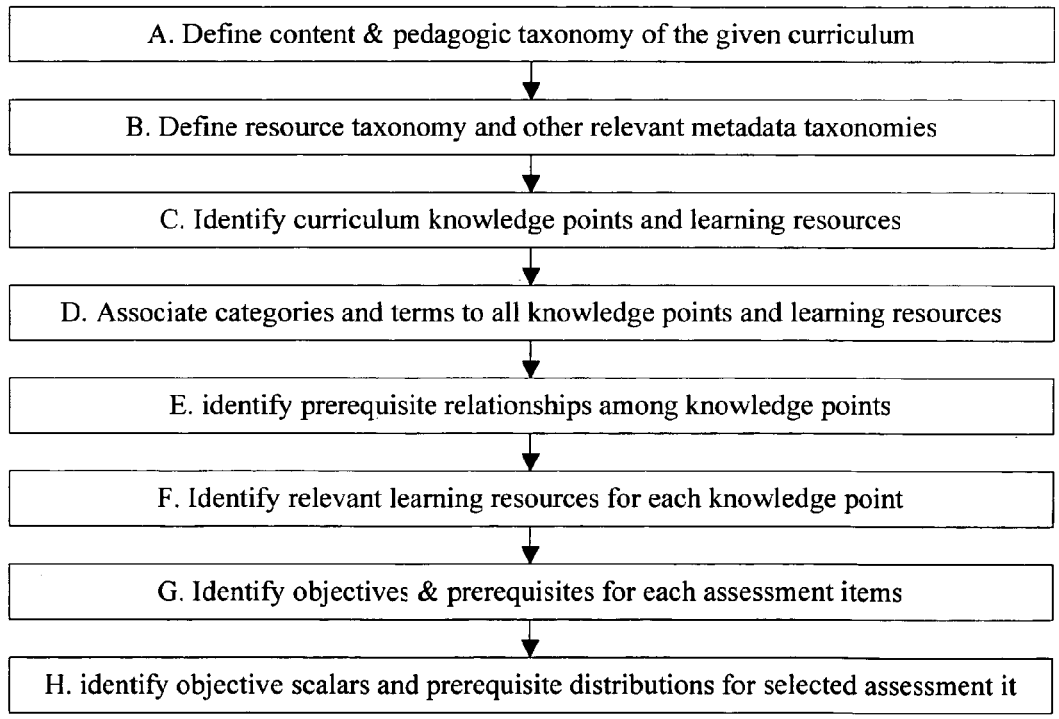
Figure 14 Steps to enable a curriculum

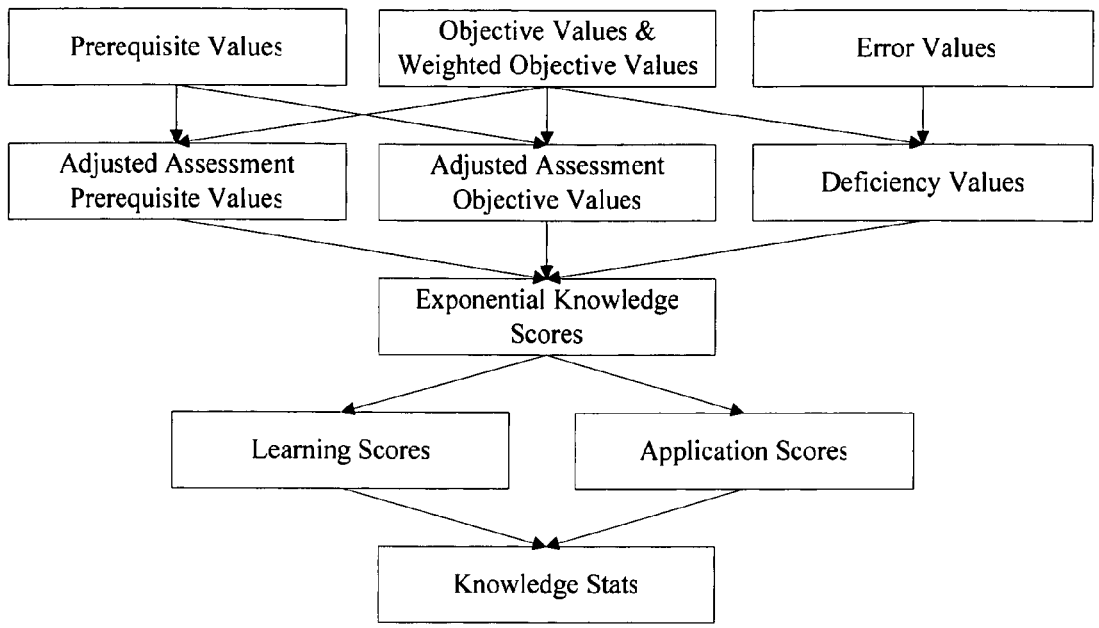

Figure 15 Calculation dependency of knowledge values

| Learner | Chapter 1 Test | Chapter 2 Test | Chapter 3 Test | Chapter 4 Test | Total Average |
|---|---|---|---|---|---|
| John Reynolds | 97% | 93% | 95% | 88% | 93% |
| Jan Doe | 86% | 92% | 85% | 79% | 86% |
| Kevin Smith | 74% | 84% | 79% | 72% | 77% |
| Terri Kirkland | 93% | 91% | 89% | 97% | 93% |
| Lan Hong | 56% | 72% | 64% | 66% | 65% |

Figure 16 Example of summative assessment report for selected learners

John Reynolds

| Assessment | Performance |
|---|---|
| Chapter 1 Test | 97% |
| Chapter 2 Test | 93% |
| Chapter 3 Test | 95% |
| Chapter 4 Test | 78% |

Total Average     91%

Figure 17 Example of summative assessment report for a learner

| Learning Objective | Current Assessment Results | Learning Resources |
|---|---|---|
| 3.1.1 Definition of linear equations of one variable | 97% | ⇒ |
| 3.1.2 Method for solving equations of one variable | 93% | ⇒ |
| 3.1.3 Examples of solving linear equations of one variable | 95% | ⇒ |
| 3.2.1 Applications of solving linear equations of one variable | 78% | ⇒ |

Figure 18 Exmaple of formative assessment reports

| Book Unit | Knowledge Point | Coverage | Class Assessment Average | Class Knowledge Status | Related Knowledge |
|---|---|---|---|---|---|
| 1.1.1 | Real Number Line | 2 | 90% | Good | ⇒ |
| 1.1.2 | Plotting Points on the Number Line | 3 | 87% | Good | ⇒ |
| 1.1.3 | Set of Real Numbers | 1 | 84% | Excellent | ⇒ |
| 1.2.1 | Inequalities | 4 | 77% | Weak | ⇒ |
| 1.2.2 | Opposite and Absolute Value of a Real Number | 2 | 69% | Good | ⇒ |
| 1.2.3 | Variable and Expression | 2 | 75% | Weak | ⇒ |
| 1.2.4 | Evaluating Algebraic Expressions | 1 | 91% | Good | ⇒ |
| 1.2.5 | Exponential Expressions | 1 | 87% | Excellent | ⇒ |
| 1.3.1 | Square Roots and Cubic Roots | 3 | 76% | Good | ⇒ |
| 1.3.2 | Order of Operation | 2 | 68% | Weak | ⇒ |
| 1.3.3 | Applications | 2 | 94% | Good | ⇒ |

Figure 19 Example of personal knowledge report

Personal Knowledge Profile

Knowledge Space Map

| | Book Unit | Knowledge Point | Assigned Coverage | Self-Practice Coverage | Personal Knowledge Status | Class Knowledge Status | Related Knowledge |
|---|---|---|---|---|---|---|---|
| Chapter 1 | | | | | | | |
| Section 1 | 1.1.1 | Real Number Line | 2 | 4 | Excellent | Good | ⇧ |
| Section 2 | 1.1.2 | Plotting Points on the Number Line | 3 | 4 | Good | Good | ⇧ |
| Section 3 | 1.1.3 | Set of Real Numbers | 1 | 1 | Excellent | Excellent | ⇧ |
| Section 4 | 1.2.1 | Inequalities | 4 | 0 | Good | Weak | ⇧ |
| Section 5 | 1.2.2 | Opposite and Absolute Value of a Real Number | 2 | 0 | Excellent | Good | ⇧ |
| Chapter 2 | 1.2.3 | Variable and Expression | 2 | 3 | Weak | Weak | ⇧ |
| Chapter 3 | 1.2.4 | Evaluating Algebraic Expressions | 1 | 2 | Excellent | Good | ⇧ |
| Chapter 4 | 1.2.5 | Exponential Expressions | 1 | 4 | Excellent | Excellent | ⇧ |
| Chapter 5 | 1.3.1 | Square Roots and Cubic Roots | 3 | 5 | Good | Good | ⇧ |
| Chapter 6 | 1.3.2 | Order of Operation | 2 | 2 | Weak | Weak | ⇧ |
| Chapter 7 | 1.3.3 | Applications | 2 | 1 | Weak | Good | ⇧ |
| Chapter 8 | | | | | | | |

Figure 20 Example of Assessment Knowledge Reprot

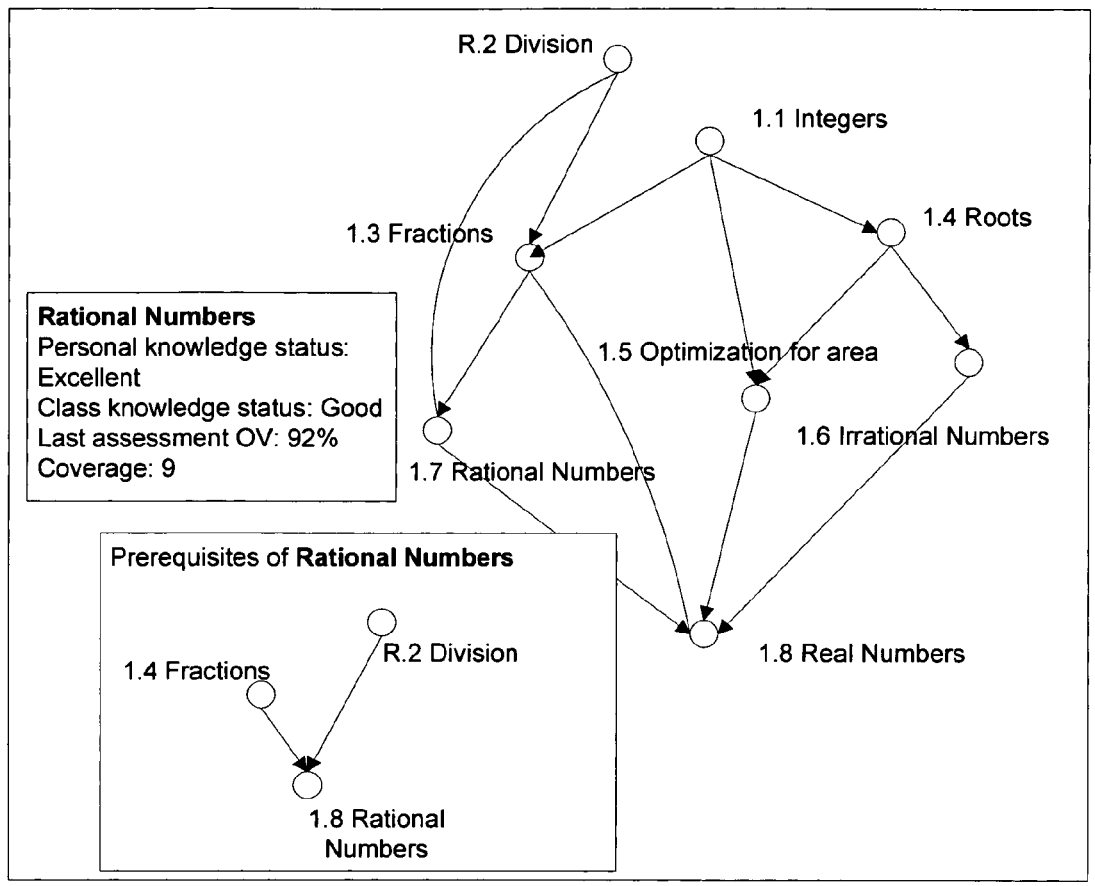
Figure 21 Knowledge map example

Class Study Guide: Chapter 1 Section 1 and Section 2 Homework　　　　Dependency Map View　[Print]　[Save]

| Study Order | Book Unit | Knowledge Point | Curriculum Priority | Assessment Coverage | My Status | Review Material | | Type | Location | Note |
|---|---|---|---|---|---|---|---|---|---|---|
| Step 1 | 1.1 | Integers | High | 2 | Excellent | [x] | Integers | Definition | P.7 | ⇧ |
| | | | | | | [x] | Integers | Examples | P.7 | |
| Step 2 | 1.1 | Natural Numbers | High | 1 | Good | [x] | Natural Numbers | Definition | P.9 | ⇧ |
| | | | | | | [x] | Natural Numbers | Example | P.10 | |
| | | | | | | [x] | Natural Numbers | Example | P.11 | |
| Step 3 | 1.2 | Rational Numbers | High | 2 | Excellent | [x] | Rational Numbers | Definition | P.12 | ⇧ |
| Step 4 | 1.3 | Positive and negative numbers | Mid | 3 | Good | [x] | Positive Numbers | Example | P.14 | ⇧ |
| | | | | | | [x] | Negative Numbers | Example | P.15 | |
| Step 5 | 1.3 | Irrational numbers | High | 3 | Week | [x] | Irrational Numbers | Definition | P.18 | ⇧ |
| Step 6 | 1.4 | Set of real numbers | High | 2 | Excellent | [x] | Set | Definition | P.20 | ⇧ |

Figure 22 Study guide example

| Current Assignment | Past Assignment | | | | | |
|---|---|---|---|---|---|---|
| # | Due Date | Name | Type | Points | Study Guide | Repots |
| 1 | Fri 02/05/07 5:00 PM | Chapter 1 Sections 1 & 2 Homework Repeatable practice, odd questions of end of section exercises | Homework | 10 | ⇑ | ⇑ |
| 2 | Mon 02/08/07 5:00 PM | Chapter 1 Sections 3 & 4 Homework Repeatable practice, odd questions of end of section exercises | Homework | 10 | ⇑ | ⇑ |
| 3 | Wed 02/10/07 5:00 PM | Chapter 2 Sections 1 & 2 Homework Repeatable practice, odd questions of end of section exercises | Homework | 10 | ⇑ | ⇑ |

Figure 23 Available study guide for assessment

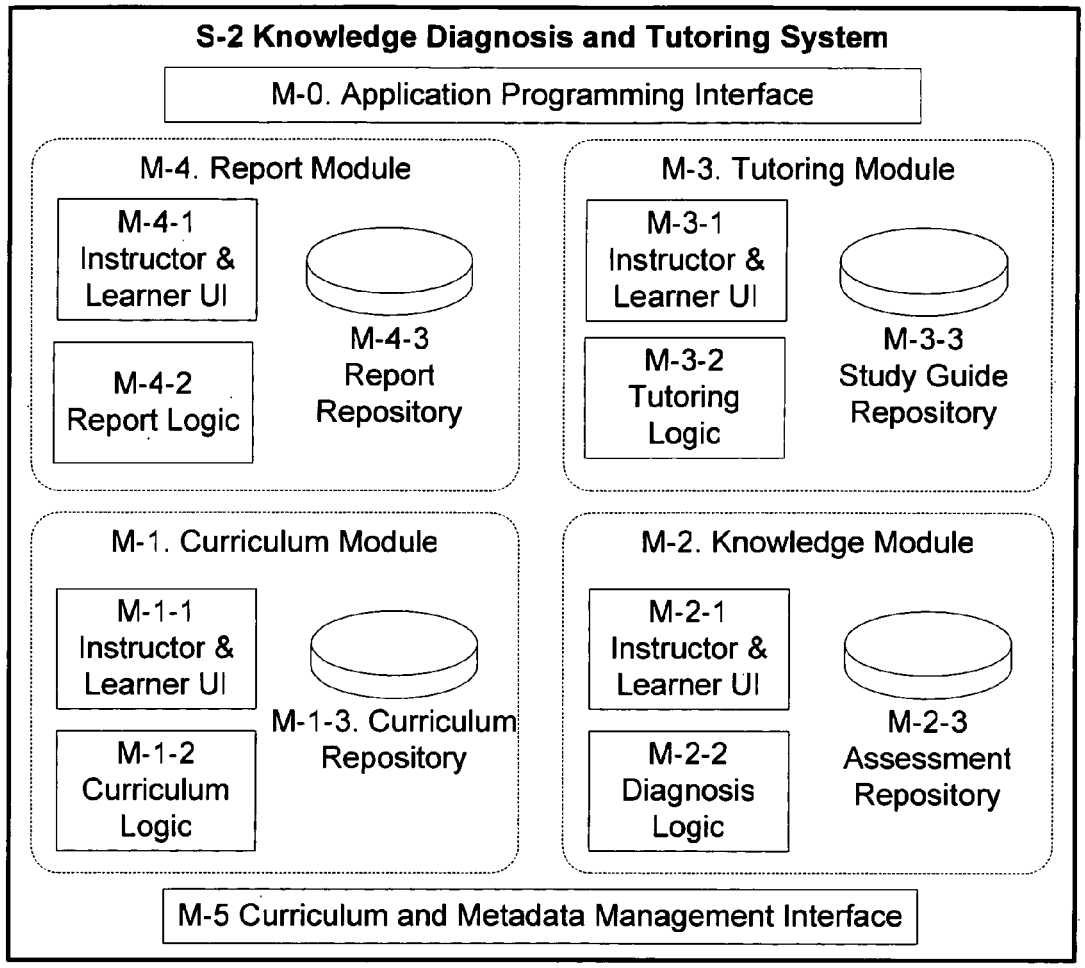
Figure 24 System Overview

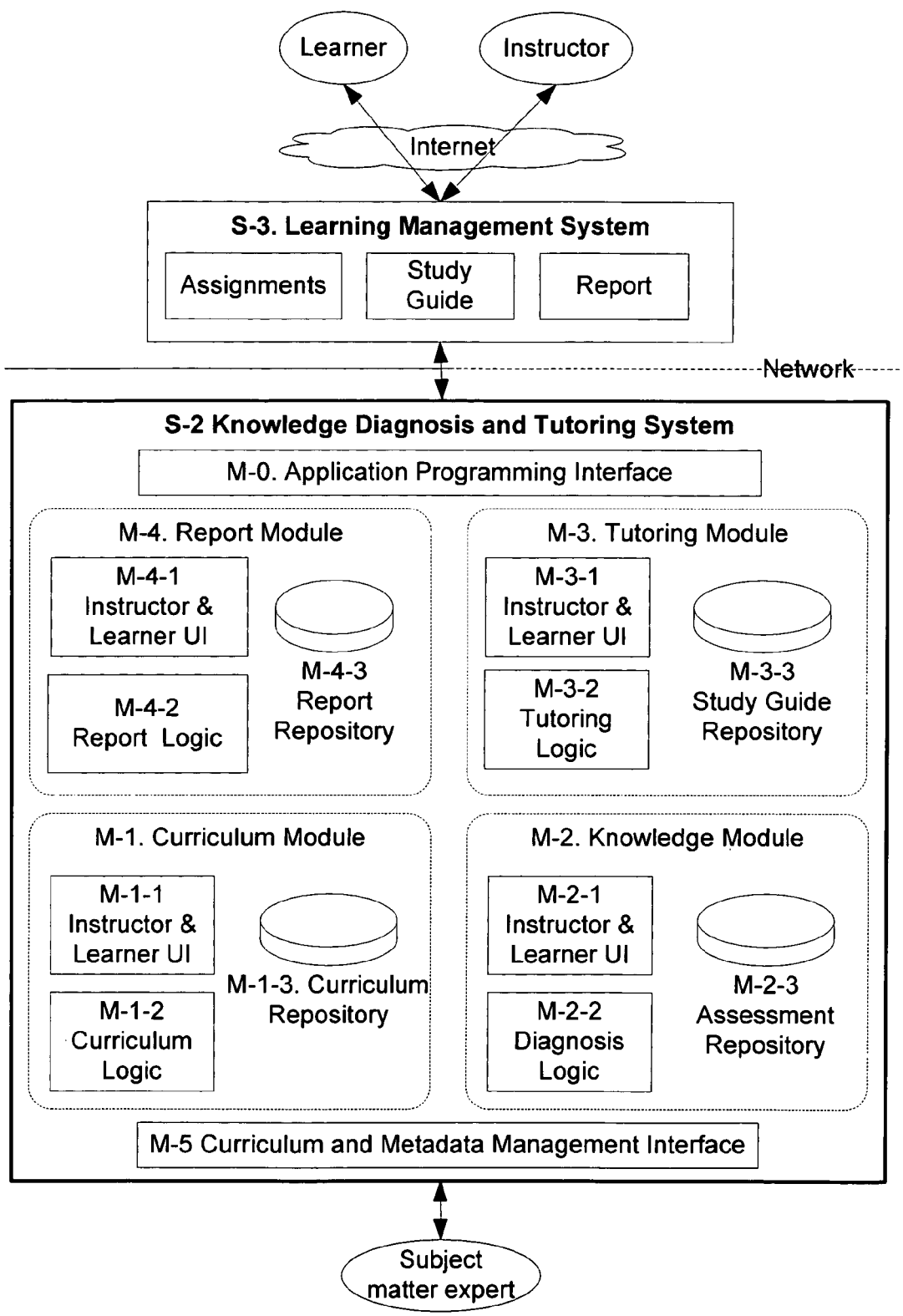
Figure 25 Embodiment to support a minimum learning management system

| 1. Basic Infomration | 2. Study Content | 3. Options |
|---|---|---|

Select study content | v

- ⊞ Chapter 1 Real Numbers
- ⊟ Chapter 2 Inequalities
  - ☐ Section 1 Linear Inequalities
  - ☒ Section 2 Solving linear inequalities
  - ☒ Section 3 Solving set of linear inequalities
- ⊞ Chapter 3 Functions
- ⊞ Chapter 4 Exponential Functons
- ⊞ Chapter 5 Applications of Exponential Functions
- ⊞ Chapter 6 Logarithm Functions
- ⊞ Chapter 7 Applications of Logarithm Functions
- ⊞ Chapter 8 Graph of Functions Figure 26 Customize curriculum content

| 1. Basic Infomration | 2. Study Content | 3. Options |
|---|---|---|

Select Quetions | v

- ⊞ Chapter 1 Real Numbers
- ⊟ Chapter 2 Inequalities

Section 1 Linear Inequalities

| ☒ Question 1 | ☒ Question 2 | ☒ Question 3 |
  |---|---|---|
  | ☒ Question 4 | ☒ Question 5 | ☒ Question 6 |
  | ☒ Question 7 | ☒ Question 8 | ☒ Question 9 |
  | ☒ Question 10 | ☒ Question 11 | ☒ Question 12 |
  | ☒ Question 13 | ☒ Question 14 | ☒ Question 15 |

Section 2 Solving linear inequalities

Section 3 Solving set of linear inequalities

Figure 27 Customize assessment items

| 1 Basic Information | 2 Study Coverage | 3. Learning Resources |

Select Quetions [ v ]

| Knowledge Point | Priority | Class Status | Required | Learning Material | Type | Location |
|---|---|---|---|---|---|---|
| ⊞ Chapter 1 Real Numbers | | | | | | |
| ☐ Chapter 2 Inequalities | | | | | | |
| ☐ Section 1 Linear Inequalities | | | | | | |
| ☒ Real numbers | High v | Good | ☒ | Real numbers | Definition | |
| | | | ☒ | Real numbers | Example | |
| ☒ Real line | High v | Good | ☒ | Real line | Definition | |
| | | | ☒ | Real line | Example | |

Figure 28 Customize learning resources and learning priorities

```xml
<?xml version="1.0" encoding="UTF-8" ?>
<XMLData>
<Submission Time="Wed Feb 22 17:57:39 EST 2008" UserType="student" SubmissionType="Self-Practice"
        SystemID="001234" UserID="55557223"/>
<Curriculum CurriculumID="6452363741" ParentID="434434334" AuthorID="43534"/>
<Class ClassID="434334434" InstituteID="4343433" InstructorID="9433434"/>
<Assessment AssessmentID="23323232" AssessmentSource="4234232" AssessmentType="assessment" AttemptCount="3" />
<Results>
<Item ItemID="434344343" ItemSource="434343" ItemSequence="1">
<ItemContent> <![CDATA[ ... ]]> </ItemContent> <ItemAnswer > <![CDATA[ A]]> </ItemAnswer>
 <LearnerResponse> <![CDATA[ B ]]></LearnerResponse> <Correct Status="N"/>
</item>
<Item ItemID="434344343" ItemSource="434344" ItemSequence="2">
<ItemContent> <![CDATA[ ... ]]> </ItemContent> <ItemAnswer >
<![CDATA[ A]]></ItemAnswer>
 <LearnerResponse> <![CDATA[B]]></LearnerResponse> <Correct Status="N"/>
</item>
<Item ItemID="434344343" ItemSource="434367" ItemSequence="3">
<ItemContent> <![CDATA[ ... ]]> </ItemContent> <ItemAnswer > <![CDATA[C]]>
</ItemAnswer>
 <LearnerResponse> <![CDATA[C]]></LearnerResponse> <Correct Status="Y"/>
</item>
<Item ItemID="434344343" ItemSource="434374" ItemSequence="4">
<ItemContent> <![CDATA[... ]]> </ItemContent> <ItemAnswer > <![CDATA[C]]>
</ItemAnswer>
 <LearnerResponse> <![CDATA[C]]></LearnerResponse> <Correct Status="Y"/>
</item>
</Results>
</XMLData>
```

Figure 29 Assessment results XML

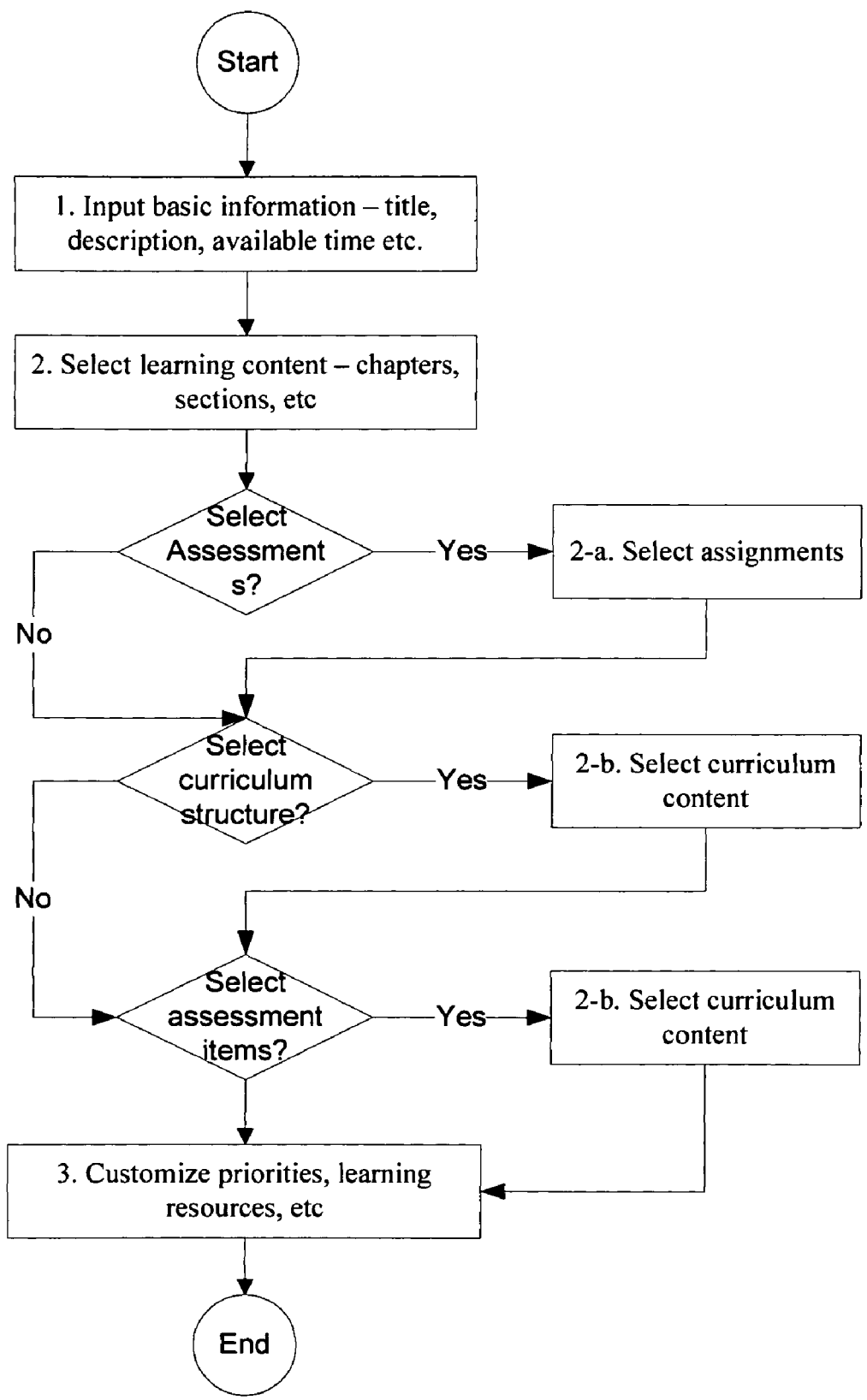
Figure 30 Study Guide Editor Workflow

Figure 31 Study guide editor – set basic information

Figure 32 Study guide editor – selecting knowledge points

| 1. Basic Infomration | 2. Study Coverage | 3. Options |

Select Quetions      V

⊞ Chapter 1 Real Numbers
⊟ Chapter 2 Inequalities
    Section 1 Linear Inequalities ☒ Question 1      ☒ Question 2      ☒ Question 3
        ☒ Question 4      ☒ Question 5      ☒ Question 6
        ☒ Question 7      ☒ Question 8      ☒ Question 9
        ☒ Question 10    ☒ Question 11    ☒ Question 12
        ☒ Question 13    ☒ Question 14    ☒ Question 15

Section 2 Solving linear inequalities
    Section 3 Solving set of linear inequalities Figure 33 Study guide editor – selecting assessment items

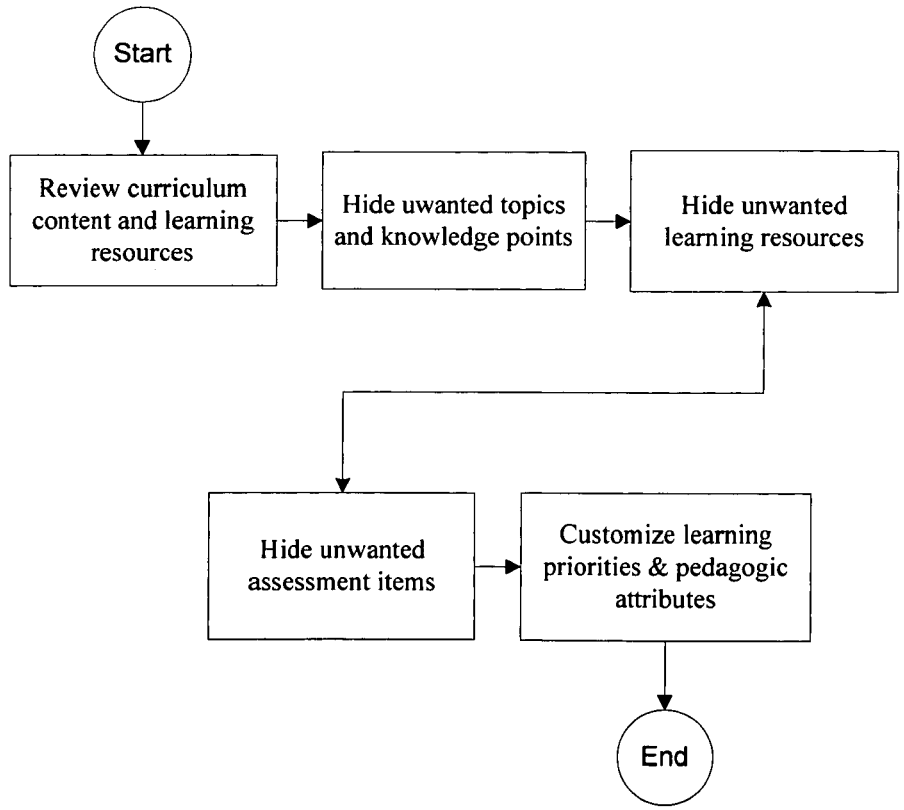

Figure 36 Instructor curriculum customization workflow

| 1 Basic Infomration | 2 Study Coverage | 3. Learning Resources |
|---|---|---|

Select Quetions [v]

| Knowledge Point | Priority | Class Status | Required | Learning Material | Type | Location |
|---|---|---|---|---|---|---|
| ⊞ Chapter 1 Real Numbers | | | | | | |
| ☐ Chapter 2 Inequalities | | | | | | |
|   ☐ Section 1 Linear Inequalities | | | | | | |
|     ☒ Real numbers | High [v] | Good | ☒ | Real numbers | Definition | P 1 |
| | | | ☒ | Real numbers | Example | P 1 |
| | | | ☒ | Real numbers | Example | P 1 |
|     ☒ Real line | High [v] | Good | ☒ | Real line | Definition | P 3 |
| | | | ☒ | Real line | Example | P 3 |

Figure 34 Study guide editor – customize lerning resources

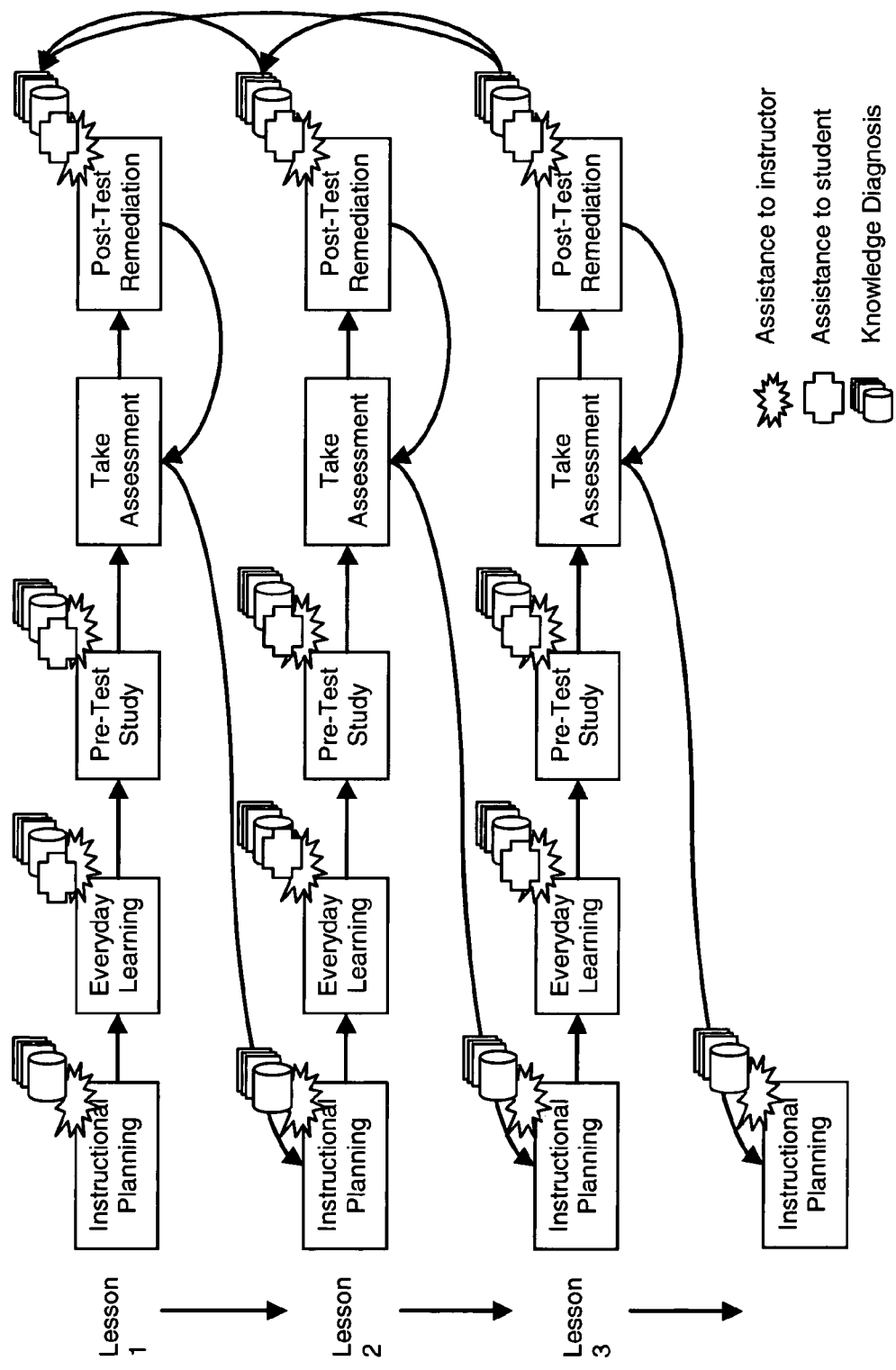
Figure 35 Teaching and learning assistance

METHOD AND SYSTEM FOR KNOWLEDGE DIAGNOSIS AND TUTORING

FIELD OF THE INVENTION

The invention relates to the field of knowledge diagnosis and tutoring in e-learning for education and knowledge training. More specifically, this invention relates to method and system of knowledge diagnosis and tutoring that provide instructors and learners with intelligent teaching and learning assistance in online learning management systems.

BACKGROUND OF THE INVENTION

In recent decades, online learning technology has made significant progress in secondary and higher education, corporate trainings, and professional development. Typical online learning applications in use today are course management systems, homework management systems, assessment management systems, tutoring applications, and hybrids of the former systems.

Course management systems typically focus on providing tools for instructors to deliver course information and course material online and for learners to access course information and online learning content. Homework management systems normally have similar course management functions as a course management system, but provide more features in assignment management for online quizzing and practice. Most of homework management systems use one or more internal or external quiz engines to deliver and grade various online assignments.

Typical assessment management systems focus more on assessing learner's learning status. Such systems use a variety of assessment methodologies ranging from summative assessment, formative assessments, to adaptive assessment. These assessment methodologies largely determined specifically their content format, assignment creation, assessment delivery, and results grading. In recent years, a clear trend is to link assessment more closely with learning, and has gained significant success in practice with many formative assessment systems.

To date, online learning tutoring systems have a much smaller user base in e-learning comparing with course management systems, homework management systems, and assessment management systems. Most tutoring systems fit into the so called intelligent tutoring systems (ITS) that attempt to provide one-to-one tutoring experiences to help learners in their study.

Most of today's ITS systems tries to provide detailed, step-by-step practice-based instructions to help learner in problem solving or skill building. Some ITS systems try to establish learning environments close to certain specific teaching and learning models in order to better utilize learner's learning behavior to tailor strategies and methods to provide more explanations, examples, demonstration, and practice exercises. Some other ITS systems focus on specific knowledge domain and build intelligence and business logics deeply into their assessment and learning content, similar to what many adaptive assessment systems have done. At the same time, without a suitable ITS, to make up the gap between practice, assessment, and learning assistance, some of the learning management systems add on tutoring features by adding logic rules in quiz content and grading mechanisms to provide certain context specific guidance and help.

Main challenges that today's ITS systems face are also rooted in limitations and risks associated within themselves:

1) Are limited to specific knowledge domain or even a specific course subject and cannot support a wide range of subjects and topics;
2) Are limited to specific teaching and learning methodology and cannot effectively integrated with instructor and learners daily teaching and learning activities;
3) Impose high cost for content development due to the need of system specific content and cannot accommodate or reuse existing teaching and learning content or content in different media format or platform;
4) Impose high risk and cost in adoption due to most ITS systems are self-enclosed systems that require users to migrate from existing adopted systems or learn to use a new system;
5) Offer limited content, assessment, and learning assistance and do not provide daily learning assistance to their users.
6) Are inflexible to support curriculum customization.

The present invention shares with previous ITS systems in concepts of interactive and personalized learning, online learning, and in-time and context specific feedback. The present invention uses new knowledge model and algorithms for knowledge diagnosis and tutoring. The present invention overcomes many limitations of previous ITS systems. The present invention can be implemented for a wide spectrum of knowledge domain, supports different teaching and learning styles, allow easy curriculum customization, does no need of recreate system specific assessment and learning content, can work with other learning management systems, and can be used by instructors and learners in their daily activities.

BRIEF SUMMARY OF THE INVENTION

Primary goal of the present invention is to provide method and system that offers effective and cost efficient learning assistance for learners across wide range of knowledge domains, teaching and learning styles, assessment content, and learning resources.

The present invention comprises a method and a system for knowledge diagnosis and tutoring in any knowledge domain. The present invention differs from prior arts with new mathematical knowledge model for knowledge presentation and heuristic algorithms. The knowledge model allows the present invention to be applied to curricula in different knowledge domain quickly and cost effectively. The knowledge model also allows creations of new computational algorithms that provide effective and intelligent knowledge diagnosis and tutoring with minimum requirement on assessment and learning content. As a result, the present invention supports curricula in different disciplines and subjects and allows easy curriculum customization for different teaching and learning styles. A preferred embodiment of the present invention can be an add-engine to existing learning management systems, working with existing assessment and learning content in any format, and hence maximizes ROI of existing investment and technology for end users, application service providers, and content providers.

More specifically, the knowledge model invented in the present invention comprises representation frameworks for curriculum and assessment. The curriculum framework manages knowledge to be learned, knowledge prerequisite relationship, pedagogic categorizations, and learning priorities. The assessment framework manages assessment items of the curriculum. It contains information on objectives and prerequisite knowledge of each assessment items and related statistical learning distributions.

Combinatorial and statistical algorithms are used in the present invention for knowledge diagnosis and tutoring. But the general methodology allows other types of algorithms that utilize the same knowledge model to be used in the present invention. The computational algorithms take account a wide variety of research results in algorithms, learning patterns, data processing, and cognitive learning. They utilize not only learner's current performance in a single assessment, but also learner's learning history and curriculum knowledge ontology. The algorithms of the present invention allow the system to better understand learner's knowledge master status as learner progress in the curriculum and provide intelligent personalized learning assistance.

BRIEF DESCRIPTION OF DRAWINGS

FIG. 1 is a conceptual diagram which illustrates the composition of the system in this invention;

FIG. 2 is an example of content taxonomy category according to the invention;

FIG. 3 is an example of category terms of a content taxonomy according to the invention;

FIG. 4 is a conceptual diagram which illustrates a subset of knowledge points of a learning objective of a particular curriculum according to the invention;

FIG. 5 is an example of pedagogic categories and their terms according to the invention;

FIG. 6 is an example of pedagogic categories and associate term of a knowledge point according to the invention;

FIG. 7 is a conceptual diagram which illustrates learning resources of a knowledge point according to the invention;

FIG. 8 is a conceptual diagram which illustrates metadata associated with learning resources according to the invention;

FIG. 9 is a conceptual diagram which illustrates direct prerequisite relationships among knowledge points in this invention;

FIG. 10 is an example of prerequisite digraph in this invention;

FIG. 11 is a conceptual diagram which illustrates knowledge prerequisite distribution in this invention;

FIG. 12 is a conceptual diagram which illustrates objectives and prerequisites of an assessment item according to the invention;

FIG. 13 is a conceptual diagram which illustrates objective scalars and prerequisite distribution of an item according to the invention;

FIG. 14 is a conceptual diagram which illustrates steps to enable a curriculum in this invention;

FIG. 15 is a conceptual diagram which illustrates calculation dependency of knowledge values in this invention;

FIG. 16 is an example of summative assessment report for selected learners in this invention;

FIG. 17 is an example of summative assessment report for a learner in this invention;

FIG. 18 is an example of formative assessment reports in this invention;

FIG. 19 is an example of assessment knowledge report in this invention;

FIG. 20 is an example of personal knowledge report in this invention;

FIG. 21 is an example of knowledge map in this invention;

FIG. 22 is an example of study guide in this invention;

FIG. 23 is an example of available study guide for assessments according the invention;

FIG. 24 is a conceptual diagram which illustrates the system in this invention;

FIG. 25 is a conceptual diagram which illustrates the system associated with a minimum learning management system according to the invention;

FIG. 26 is an example of user interface for customizing curriculum content of a curriculum according to the invention;

FIG. 27 is an example of user interface for customizing assessment items of a curriculum according to the invention;

FIG. 28 is an example of user interface for customizing learning resources and learning priorities of a curriculum according to the invention;

FIG. 29 is an example of assessment results XML according to the invention;

FIG. 30 is a conceptual diagram which illustrates study guide editor workflow according to the invention;

FIG. 31 is an example of study guide editor interface of setting basic study guide information according to the invention;

FIG. 32 is an example of study guide editor interface of selecting knowledge points for a study guide according to the invention;

FIG. 33 is an example of study guide editor interface of selecting assessment items for a study guide according to the invention;

FIG. 34 is an example of study guide editor interface of customizing learning resources for a study guide according to the invention;

FIG. 35 is a conceptual diagram which illustrates typical teaching and learning process that this invention is designed for FIG. 36 is a conceptual diagram which illustrates instructor curriculum customization workflow

DETAIL DESCRIPTION OF THE INVENTION

The present invention comprises method and system for knowledge diagnosis and tutoring for curriculum in any knowledge domain. Given a curriculum, the present method starts from defining a knowledge model for the curriculum, then enabling the curriculum by applying the knowledge model on the curriculum. The present method comprises step-by-step computation method to analysis learner's every assessment submission and evaluates learner's knowledge status. The present method provides intelligent tutoring with study guides based on learner's knowledge status in different phases of learning. The present system can be implemented as add-on engine for any online learning management system. FIG. 1 is an overview of a preferred embodiment of the present invention with a learning management system.

Knowledge Model

The present invention differs from prior arts with new knowledge model for knowledge presentation and heuristic algorithm design. The knowledge model allows the present invention to be applied to curricula in different knowledge domain quickly and cost effectively.

The knowledge model includes a curriculum framework for representing a curriculum in a knowledge domain and an assessment framework for representing assessment of the curriculum.

Curriculum Framework

A curriculum can be any learning program for a given course of study in any subject area of a knowledge domain, comprising ranges of knowledge to be learned, learning goals to be measured, instructional and learning materials to be used. In a preferred embodiment, a curriculum can be a textbook, a manuscript, an outline of topics, an online course delivered by a learning management system, or training sessions ran by a training or tutoring system.

Curriculum objectives often are measurable learning outcomes or learner behaviors and are often called learning objectives or learning goals. Different curricula specify learning objectives in different granularity. When a learning application is designed around the concept of learning objective, it faces significant challenge of applying itself consistently across different curricula in different subject area of different knowledge domains.

The present invention uses a content taxonomy to represent hierarchy structure of a curriculum, a pedagogic taxonomy to categorize pedagogic attributes of curriculum teaching and learning materials, and a resource taxonomy to describe location and asset types of learning resources.

Prior assessment management systems and tutoring systems often have knowledge assessment logic and system-user interactions deeply embedded within assessment content and learning content, such as various existing formative assessment systems, adaptive assessment systems and cognitive tutoring systems, which greatly limits where they can be applied, restricts curriculum customization, and imposes significant enabling cost in new content creation and new system adoption.

In comparison to prior systems, the present invention is flexible to work with different curricula, allows easy curriculum customization for individual instructors, work with existing assessment and learning content, and hence significantly reduces the cost in time and money to provide knowledge diagnosis and tutoring features to existing learning management systems.

Content Taxonomy

The curriculum framework in the present invention comprises two required taxonomies: content taxonomy and pedagogic taxonomy. The content taxonomy of a curriculum comprises a set of controlled hierarchic categories. There is no limitation on the number of different categories in the content taxonomy in the present invention. Each category has one or more terms associated with it. For example, a "Chapter" category may have terms "Chapter", "Preface", "Introduction", and "Appendix"; a "Knowledge Point" category may have only one term "Knowledge Point"; and a "Learning object" category may have terms "Example", "Video", "Calculator". Terms of different categories may or may not have the same name. FIG. 2 is an example of content taxonomy hierarchy for a curriculum based on a textbook. FIG. 3 illustrates categories and associated terms of a content taxonomy.

Content taxonomy may vary for different curricula and knowledge domains. For a given curriculum, subject matter experts need to review the specific curriculum and define an appropriate content taxonomy for the curriculum.

Knowledge Points

The present invention applies the content taxonomy to a curriculum to represent the hierarchy structure of the curriculum. It does not attempt to categorize all structure or content in a curriculum. The main objective is to identify learning objectives and knowledge points in the curriculum and prerequisite relationships among knowledge points.

The present invention requires that the content taxonomy of a curriculum must have a category "Learning Objective" or its equivalent. The scope of a learning objective in a curriculum is usually the measurable learner behaviors or skills or fact that the curriculum contains for learning and applying.

The present invention requires that the content taxonomy of a curriculum must have a category "Knowledge Point" or its equivalent. The scope of a knowledge point in a curriculum is usually the least unit of measurable learner behaviors or skills or fact that the curriculum contains for learning and applying. Knowledge points in the present invention are often in a narrower scope than learning objectives commonly referenced in other applications and situations.

For example, in a college algebra curriculum, a learning objective of the curriculum can be "Forms of linear equation of one variable", and knowledge points under this learning objective may be "General form", "Standard form", "Slop-intercept forms", "Two-point form", "Parametric form", and "Normal form". It may also be the case that in a similar curriculum, "Slop-intercept forms" actually is broke into two knowledge points of "X-axis formula" and "Y-axis formula".

It is also possible that the learning objective in a curriculum is defined in a more narrow scope than others do and hence a learning objective contains only one knowledge point. In such case a learning objective is equivalent to a knowledge point. For example, in an algebra curriculum for business majors, "Calculate compounded interest rate" can be a learning objective, and also a knowledge point. FIG. 4 demonstrate knowledge points of a learning objective in an algebra curriculum.

Pedagogic Taxonomy

The present invention uses a pedagogic taxonomy for categorizing pedagogic attributes of knowledge points in a curriculum, and assessment items of the curriculum. The pedagogic categorization is used to guide and analyze learner's learning and inform instructor's teaching.

Similar to the content taxonomy, a pedagogic taxonomy used in the present invention comprises a set of hierarchic categories and each category has one or more terms associated with it. Bloom's taxonomy for cognitive learning is a typical pedagogic taxonomy that can be used for a curriculum in the present invention. FIG. 5 demonstrate part of a pedagogic taxonomy used for a college algebra curriculum based on Bloom's taxonomy.

Each knowledge point in the curriculum is associated with one or a plurality of pedagogic categories from the pedagogic taxonomy. Categories for a knowledge point should be chosen according to the design and objective of the knowledge point in the curriculum. Furthermore, if a pedagogic category is associated with a knowledge point, then it will be further assigned with one or a plurality of terms from that category. FIG. 6 is an example of pedagogic categories and associated terms of a knowledge point in a curriculum of algebra for the present invention.

Pedagogic taxonomy may vary for different curricula and knowledge domains. For a given curriculum, subject matter experts need to review the specific curriculum and define an appropriate pedagogic taxonomy for the curriculum.

Learning Resources

The present invention uses learning resources to specify learning and teaching materials of a curriculum. Learning resources can be as precise as what are normally described as learning object, the least learning blocks in a curriculum, such as a specific format of a definition, an example, a description of a method, a table and its descriptions, a video of a class segment. Learning resources can also be as broad as a reading material that covers a wide range of knowledge points of the curriculum or even extend beyond the scope of the curriculum, as long as it is supplied by the curriculum. A knowledge point in a curriculum may have one or more learning objects.

The present invention partitions learning content of a curriculum into learning resources. The scope of a learning resource can very as long as it is suitable for learning and mastery of knowledge points specified in the content taxonomy. For example, when a curriculum is based on a textbook or a well draft manuscript, then most learning resources are learning objects corresponding to the least learning blocks in the textbook. The rest of the learning resources can be reference materials in different format. FIG. 7 is an example of different learning resources of a knowledge point in a curriculum.

The present invention does not require all learning resources exist in the same learning management system or in the same format. A learning resource can be a segment of content in a textbook, a case study in a book or handout, or material online. The present invention makes it possible to reuse any existing learning material available online, offline or in different applications.

Resource Taxonomy

Resource taxonomy is used to define categories and properties for resource locations and types of learning resources. Various asset and learning related taxonomies existed in the public knowledge domain can be used as template of resource taxonomy.

Resource taxonomy may vary for different curricula and knowledge domain. For a given curriculum, subject matter experts need to review the specific curriculum and define appropriate resource taxonomy for the curriculum.

Other Taxonomies in Content Framework

The content framework allows inclusion of other optional metadata taxonomies. For example, learning preference taxonomy can be used to classify difficulty levels and priorities for knowledge points and learning resources of a curriculum, and semantic metadata taxonomy can be used for purpose such as semantic search in a specific embodiment. Metadata defined by these optional taxonomies can be used to provide instructors and learners more teaching and learning assistance features in a specific curriculum. These taxonomies are not required by the present invention for knowledge diagnosis and tutoring. FIG. 8 demonstrate that the learning resources in FIG. 7 have other sets of metadata associated with them.

For a given curriculum, subject matter experts need to review according to the specific curriculum and desired learning assistance features to define appropriate metadata taxonomy for the curriculum.

Assessment Framework

The assessment framework of the present invention comprises prerequisite relationships among knowledge points, prerequisite relationships between assessment items and knowledge points, representation model of such relationships, and statistical distributions related to these relationships.

Prerequisite Relation

The prerequisite relation among knowledge points is similar to partially ordered relation on a set. Different from traditional knowledge space theory or partially ordered sets, the present invention distinguishes the direct prerequisite relationship from the implicit prerequisite relationship among knowledge points. In its visual presentation or data structure, the present invention only uses the direct prerequisite relationship for efficiency and clearness. The present invention uses both direct and implicit prerequisite relationships in computation.

In a curriculum, a knowledge point A is a prerequisite of another knowledge point B if learners' mastery of A requires mastery of B. Knowledge point A is a direct prerequisite of knowledge point B if the knowledge or content of knowledge A is directly utilized in mastery of knowledge point B. For example, solving a linear equation of one variable may require learner to mastery direct prerequisite knowledge points such as the method of solving such equations, method of adding a real number to an equation, method of dividing an equation with real numbers, and concept of identifying none-solvable equations. On the other hand, even though the definition of real number is a prerequisite for methods of adding and dividing equations with real numbers, it is not a direct prerequisite of solving linear equation.

In the present invention, a knowledge point may have one or a plurality of knowledge points as its direct prerequisite. The prerequisite relationship may be reflexive, i.e. a knowledge point may be a prerequisite of itself, for some of the knowledge points, but not necessarily true for all knowledge points. The prerequisite relation is a transitive relation, i.e. if the knowledge point A is a prerequisite of knowledge point B and the knowledge point B is a prerequisite of knowledge point C, then the knowledge point A is a prerequisite of knowledge point C. But the direct prerequisite relation is often not transitive. The prerequisite relation and direct prerequisite relation both are asymmetric i.e. if knowledge point B is a prerequisite of knowledge point A, then knowledge point A cannot be a prerequisite of B.

As illustrated in FIG. 9, each of the learning objectives L-1, L-2, L-3, and L-4 is partitioned into a set of knowledge points. Direct prerequisite relationships among knowledge points are represented by directed arcs. If a knowledge point A is a direct prerequisite of knowledge point B, then a directed arc is drawn from A to B.

Prerequisite Digraph

FIG. 10 is an example of the prerequisite digraph defined by the present invention as visual and computational model to represent the set of knowledge points and their direct prerequisite relationships from a curriculum. Computational algorithms of the present invention uses the prerequisite digraph as underline structure.

Let K be the set of all knowledge points of a curriculum. The prerequisite diagraph D(K) of the curriculum has all knowledge points of K as its vertices. A directed arc among two vertices represents a direct prerequisite relationship among two knowledge points. A prerequisite digraph may have loops at most vertices due to the fact that a knowledge point is often a direct prerequisite of itself. Prerequisite digraph defined in the present invention only represents direct prerequisite relations.

If knowledge points A and B are from a curriculum such that B is a direct prerequisite of A, then there is a directed arc from B to A in the prerequisite digraph. In the prerequisite digraph, knowledge point B will be called an immediate predecessor of A and A will be called an immediate successor of B. If there is a directed path from B to A following directed arcs, then B will be called a predecessor of A and A is a successor of B. The distance between two knowledge points is the length of shortest path between them. If there is no direct path among two knowledge points, then their distance will be denoted as A.

In a prerequisite digraph, the in-neighborhood of a knowledge point K, denoted by InN(K), contains all immediate learned predecessors of K. For a given integer n, the out-neighborhood of K, denoted by OutN(K), contains all immediate successors of K; the distanced in-neighborhood $InN_n(K)$ contains all predecessors of K that have distance exactly n from K. Similarly, the distanced out-neighborhood $OutN_n(K)$ of K contains all successor of K having distance at exactly n from K. The distance-1 in-neighborhood and distanc-1 out-neighborhood are exactly InN(K) and OutN(K). Both InN(K) and OutN(K) can be found using well-known breadth first search algorithm on acyclic digraphs.

FIG. 10 is the same prerequisite digraph in FIG. 9. In FIG. 10, knowledge point A is a direct prerequisite of itself, knowledge point B and knowledge point C. Hence A is an immediate predecessor of B and C. A is a prerequisite of D, but not a direct prerequisite of D. Hence, A is a predecessor of D, but not an immediate predecessor. The shortest direct path from A to C is 1. So A is in InN(C) and C is in OutN(A). Similarly, A is in $InN_2(D)$ and D is in $OutN_2(A)$.

Knowledge Prerequisite Distribution

The knowledge prerequisite distribution in the present invention is a statistical distribution used to describe how likely a learner's failing to mastery a knowledge point is due to learner's inadequacy on a corresponding direct prerequisite knowledge point. The knowledge prerequisite distribution varies according to specific knowledge point in different knowledge domain, learning environment, teaching and learning style, and outcome expectation of related curriculum. It can be a well defined statistical distribution or an empirical distribution.

FIG. 11 demonstrates an example of knowledge prerequisite distribution of a knowledge point. Knowledge point K has itself, $K_1$, $K_2$ and $K_3$ as direct prerequisite knowledge points. The prerequisite distribution of K is given by $f_1(K)$, $f_2(K)$, $f_3(K)$, and $f_4(K)$. Knowledge prerequisite distribution can be determined by subject matter experts for individual curriculum. When more sophisticated statistics are not available, an identity distribution can always be used as starting point, i.e. if learner failed on a knowledge point, then all of its prerequisites are consider causes of the failure with the same probability.

Assessment Item Objectives and Prerequisites

The present invention bridges assessment and curriculum learning outcomes by prerequisite relations between assessment items and knowledge points. The present invention not only measures learner's learning on curriculum desired learning outcomes, but also identifies root cause knowledge point of learner's knowledge deficiency during the learning process.

For a given curriculum, the present system can work with assessment items in a textbook, a manuscript, an assessment bank installed on a desktop computer, or an online quiz engine in a learning management system. Assessment items can also be questions in homework, a quiz, an assessment, or manuscripts distributed through training session in class, on a device, online, or any other channel of media or format accessible by learner.

Assessment items included in a curriculum are used either for enhancing learner's mastery of certain knowledge points, or assessing learner's mastery level of certain knowledge points. These knowledge points are called objective knowledge points, or objectives, in short, of an assessment item. An item may have one or a plurality of objectives in the curriculum. In some curriculum, it is also possible that an identical item may appear in different assessment to server different objectives.

Knowledge points that are explicitly required to solve an assessment item correctly are called prerequisites of the item. For example, when an item of solving a one variable linear equation is given, the learner must not only need to know correct method and steps for how to solve such equation, but also need to be able to apply some previously learned knowledge, such as simplifying an algebraic expression, simplify a linear equation, evaluate additions, subtractions, divisions and multiplications related to an equation properly.

In FIG. 12, knowledge points $K_1$, $K_2$ and $K_3$ are prerequisites of an assessment item, and $K_4$ and $K_5$ are objectives of the same item. It is possible that a knowledge point is both an objective and a prerequisite of the same assessment item.

Item Objective Scalar and Prerequisite Distribution

For each assessment item used in a curriculum, an objective scalar is assigned to each of its objective. The item objective scalar describes relative importance or preference of an objective to the item. For an assessment item, the objective scalars are assigned to its objectives separately.

Objective scalars can be real numbers of values between 0 and 1, but not necessarily probabilities, i.e. there is no necessary relationship between objective scalars on different objectives of the same assessment item. Objective scares can be specified by subject matter experts. For simplicity, object scalars can be set to 1 if it is cost prohibitive to obtain more precise measure of objective scalars.

Similarly, for each assessment item, a prerequisite distribution is assigned to its prerequisites. While objective scalars are not probabilities, the prerequisite distribution is the conditional probability that the learner has not adequately mastered the corresponding prerequisite if a learner failed on the item. The prerequisite distribution is required for every assessment item that will be assessed.

FIG. 13 illustrate objective scalars and prerequisite distribution of the same item illustrated in FIG. 12.

Quantities used to describing preference of objectives and error causes of prerequisites are not limited to formulas given in the examples. When other measurement is available to describe preference among objectives and error cause among prerequisites, appropriate formulas based on different measurements may be used to replace above mentioned quantities.

Enabling a Curriculum

Giving a curriculum, subject matter experts define curriculum framework and assessment framework for the curriculum. And then apply defined frameworks to the curriculum. Main steps to enable a curriculum includes:

1) define content taxonomy and pedagogic taxonomy of the given curriculum;
2) define resource taxonomy and other relevant metadata taxonomies for the given curriculum and learning content;
3) identify curriculum knowledge points and learning resources of the curriculum;
4) associate appropriate categories and terms to all knowledge points and learning resources;
5) identify prerequisite relationships among knowledge points of the given curriculum;
6) identify relevant learning resources for each knowledge point of the given curriculum;
7) identify objectives and prerequisites for selected assessment items of the given curriculum;
8) identify objective scalars and prerequisite distributions for selected assessment items;

FIG. 14 illustrates steps to enable a curriculum.

Customize a Curriculum

The curriculum framework and assessment framework allows removing knowledge points, assessment items, and related learning resources from a curriculum easily. The only thing instructor needs to be aware of is that removing a set of knowledge points may leave learner without enough prerequisite knowledge for some up coming knowledge points. By providing necessary warnings and options, the present system supports customizing a curriculum easily for individual instructors. Instructors may select knowledge points, assessment items, and learning resources to be used for different course settings. After customization, performance analysis, reporting, and learning assistance can be executed based on remaining knowledge points and assessment items in the customized curriculum.

FIG. 36 illustrates workflows for instructor to customize a curriculum in the present invention.

Knowledge Diagnosis

The present invention analyzes learner's knowledge status every time learner submits results of an assessment or a practice. The only required information on learner's answer for an assessment item is if the learner answered the corresponding item correctly or wrong. Up on receiving assessment result, based on specific scenario and type of assessment, the present invention calculates learner's current assessment knowledge performance and overall knowledge status. All necessary values needed for future calculation or reporting are tracked by the present invention in learner's knowledge history.

Knowledge diagnosis in the present invention is based on results from instructor assigned or learner created assessment submissions. The present invention evaluates learner's knowledge mastery status using not only latest assessment results, but also learner's knowledge history to accurately identify root causes of learner's current knowledge deficiency. Therefore, learner's historical knowledge values are not only saved for record keeping purpose, they are also used each time learner's knowledge status is updated.

Different from existing summative or formative assessment systems that evaluate learner's overall performance on learning outcomes only, the present invention evaluates learner performance for both learning outcomes and learning deficiency. Hence the present invention provides not only formative assessment type of analysis and reports, but also the knowledge deficiency root analysis for tutoring purpose.

Assessment Objectives and Prerequisites

Every time a learner submits assessment results, the present invention identify objectives and prerequisites of the assessment. Since all assessment items have been defined with objectives and prerequisites in the given curriculum, the objectives of the assessment are defined as the union of objectives of all assessment items in the assessment, and the prerequisites of the assessment are defined as union of all prerequisites of all assessment items. Most of the time, objectives and prerequisites of an assessment may have non-empty intersection.

Each time an assessment results is submitted, the present invention calculate relevant knowledge values for each objective and prerequisite of the submission. For convenience and clarity, in the rest of the descriptions of knowledge diagnosis of the present invention, assume that it is the n-th time that a knowledge point K is to related to an assessment submission, i.e., K is an objective or prerequisite of an item in current submission.

Also suppose that $q_1, \ldots, q_M$ are all items in current submission. For each item $q_i$, $i=1, \ldots, M$, assign a status variable $x_i$ so that $x_i=1$ if learner has answered $q_i$ correctly and $x_i=0$ if learner answered $q_i$ incorrectly. If a knowledge point K is an objective of some items of the submitted assessment, denote $S(K,q_i)$ as the objective scalar of K of item $q_i$. If K is a prerequisite of item $q_i$ then denote $P(K,q_i)$ as the prerequisite probability of K for item $q_i$.

Objective Value of a Knowledge Point

Similar to formative assessment, the present inventions uses objectives of assessment items to evaluate learner's outcome based performance. It measures learner's success rate among all items that have a specific knowledge point as an objective. A typical formula for evaluate learner's current performance on an objective can be as follows:

Let $I(K,q_i)=1$ if K is an objective of item $q_i$ or let $I(K,q_i)=0$ if K is not an objective of $q_i$. The objective value $OV_n(K)$ is $$OV_n(K) = \frac{\sum_{i=1}^{M} I(K, q_i) x_i}{\sum_{i=1}^{M} I(K, q_i)},$$

where the summation is over all items that has K as an objective in the submission.

Weighted Objective Value of a Knowledge Point

Learner's performance towards learning goals can also be measured using objective scalars assigned to assessment items when different preference levels are set for objectives of an item. A weighted version of objective score for knowledge point K as an objective can be calculated as follows. Let $I(K,q_i)=1$ if K is an objective of item $q_i$ or let $I(K,q_i)=0$ if K is not an objective of $q_i$. The weighted objective value $WOV_n(K)$ can be calculated by formula $$WOV_n(K) = \frac{\sum_{i=1}^{M} I(K, q_i) S(K, q_i) x_i}{\sum_{i=1}^{M} I(K, q_i) S(K, q_i)},$$

where $S(K,q_i)$ is the objective scalar of K for item $q_i$ and the summation is over all items that has K as an objective in this assessment.

Formula for weighted objective value of a knowledge point is not limited to the formula given above using objective scalars. When other measurement is available to describe preference among objectives, appropriate formulas based on different measurements may be used for the weighted objective values.

Prerequisite Value of a Knowledge Point

Prerequisite distributions on assessment items can be used to evaluate learner's readiness on prerequisites of an assessment. Let $J(K,q_i)=1$ if K is a prerequisite of item $q_i$ and $J(K,q_i)=0$ if K is not a prerequisite of item $q_i$. The prerequisite value $PV_n(K)$ of K is $$PV_n(K) = 1 - \frac{\sum_{i=1}^{M} J(K, q_i) P(K, q_i)(K)(1 - x_i)}{\sum_{i=1}^{M} J(K, q_i)},$$

where $P(K,q_i)$ is the prerequisite probability of K for item $q_i$ and the sum is over all questions that has K as a prerequisite in the submission.

Formula for prerequisite value of a knowledge point is not limited to the formula given above. When other measurement is available to describe readiness of prerequisites of an item, appropriate formulas based on different measurements may be used for the prerequisite values.

Error Score of a Knowledge Point

The present invention also uses prerequisite distribution to calculated potential error causes for a specific assessment. An exemplary measurement can be obtained as follows: Let $J(K, q_i)$ be defined as before. The assessment error score $ES_n(K)$ of K for this submission can be calculated by $$ES_n(K) = \frac{\sum_{i=1}^{M} J(K, q_i) P(K, q_i)(1 - x_i)}{\sum_{i=1}^{M} J(K, q_i) P(K, q_i)},$$

where $P(K, q_i)$ is the prerequisite probability of K for item $q_i$, and the summation is over all questions that has K as a prerequisite in the submission.

This value describes how likely the knowledge point P is a cause of error for the learner in current submission. The larger of the value $ES_n(K)$, the more likely the knowledge point K needs learner's attention. Formula for error score of a knowledge point is not limited to the formula given above. When other measurement is available to describe readiness of prerequisites of an item, appropriate formulas based on different measurements may be used for the error score.

Deficiency Value of a Prerequisite

The present invention provides learner learning assistance based on learner's knowledge status and possible error causes from each assessment. For each assessment submission, the present invention generates a "suspicious list" of prerequisites as possible candidates for learner's learning remediation or enhancement for the specific assessment. In an embodiment, such list can be any knowledge point that is a prerequisite of the assessment and has prerequisite score meet, for example, inequality $WOV_n(K) - ES_n(K) < \tau(K)$ where $$\tau(K) = \zeta(K) \sqrt{\frac{\frac{1}{\sum_{i=1}^{M} J(K, q_i) - 1} \sum_{i=1}^{M} J(K, q_i)}{((1 - x_i) P(K, q_i) - ES_n(K))^2}},$$

where $\zeta(K)$ is deficiency factor specific for given curriculum.

$DV_n(K) = WOV_n(K) - ES_n(K)$ is called the deficiency value of the prerequisite.

Formula for deficiency value of a prerequisite is not limited to the formula given above. When other measurement is available to describe readiness of prerequisites of an item, appropriate formulas based on different measurements may be used for the deficiency values.

Adjusted Objective Value and Adjusted Prerequisite Value

Suppose knowledge point K is an objective or a prerequisite of an assessment item in the assessment. If there are no previous assessment values for a knowledge point K, then this is the first time that the present learner has submitted an assessment that has this knowledge point as an objective or prerequisite. The present invention will use assessment values as initial value of its knowledge values in such case. For example, the present invention can set the adjusted objective value $AOV_1(K) = OV_1(K)$ and adjusted prerequisite value $APV_1(K) = PV_1(K)$.

If knowledge point K has been involved in previous assessment submissions, suppose $AOV_1(K), AOV_2(K), \ldots, AOV_{n-1}(K)$ are previous adjusted objective values and $APV_1(K), APV_2(K), \ldots, APV_{n-1}(K)$ are previous adjusted prerequisite values. Then the present invention updates current knowledge value taking in count of filtering out learner's accidental mistakes and learner's knowledge learning patterns. The adjusted objective value $AOV_n(K)$ and adjusted prerequisite value $APV_n(K)$ of K can be, for example, given by $$AOV_n(K) = \left(\frac{n-1}{n+1}\right) AOV_{n-1}(K) + \left(\frac{2}{n+1}\right) OV_n(K), 0 < n \le 4$$

$$AOV_n(K) = AOV_{n-1}(K) - \frac{\sum_{i=1}^{5} AOV_{n-i}(K)}{15} + \frac{1}{3} OV_n(K), n \ge 5$$

$$APV_n(K) = \left(\frac{n-1}{n+1}\right) APV_{n-1}(K) + \left(\frac{2}{n+1}\right) PV_n(K), 0 < n \le 4$$

$$APV_n(K) = APV_{n-1}(K) - \frac{\sum_{i=1}^{5} AVP_{n-i}(K)}{15} + \frac{1}{3} PV_n(K), n \ge 5$$

If knowledge point K is only a prerequisite of the submitted assessment, then one can set $AOV_n(K) = AOV_{n-1}(K)$ and $APV_n(K)$ can be calculated as in 2 above.

The purpose of above calculation is to canceling errors in objective values and prerequisite values due to accident learner responses, such learner's guessed answers, in assessment submission. Coefficients used above are based on noise filtering techniques, cognitive learning models, and statistical analysis.

These coefficients used in above formula are not limited by expressions given above. They can be adjusted by subject matter expert for a specific knowledge domain, or for a specific learning model, if desired. When other techniques are suitable to filter out data noise and accidental responses from learner, appropriate formulas based on performance history may be used for adjusted objective and prerequisite values.

Exponential Knowledge Score

The assessment exponential knowledge score captures learner's overall knowledge level based on assessment submission only. If both $AOV_n(K)$ and $APV_n(K)$ are available, this value can be expressed as, for example, $$EKS_n(K) = \frac{e^{\theta(K)(\alpha(K) AOV_n(K) + \beta(K) APV_n(K))} - 1}{e^{\theta(K)} - 1},$$

where $AOV_n(K)$ and $APV_n(K)$ are latest objective and prerequisite scores from the assessment submission. $\alpha(K)$ and $\beta(K)$ are functions such that $\alpha(K) + \beta(K) = 1$. If prerequisite and objective distributions are known, then $\alpha(K), \beta(L), \theta(K)$ are derived statistics. If not, one can set $$\alpha(K) = \frac{1}{2},$$

$$\beta(K) = \frac{1}{2},$$

and $\theta(K) = 1$ to start.

If there is no $AAO_n(K)$, i.e., K has never been an objective of any test so far, then one can set $$EKS_n(K) = \frac{e^{\theta(K) APV_n(K)} - 1}{e^{\theta(K)} - 1}.$$

Exponential knowledge score is not limited to the formula given above. When other measurement is available or for curriculum from a specific knowledge domain, appropriate formulas or methods based on different measurements may be used for exponential knowledge score.

Learning Score and Application Score

Adjusted objective value, adjusted prerequisite value, and exponential knowledge score are based on item prerequisite mapping and historical assessment results on individual knowledge points. The present invention also takes in count of prerequisite relations among knowledge points in the underlying curriculum. This allows the present invention to intelligently evaluate learner's knowledge status not only based on one time submission or an isolated assessment item or individual knowledge point, but also based on learner's knowledge history.

Let K be a knowledge point related current submitted assessment. The distance-i In-Neighborhood of K is $InN_i(K) = \{K_i^1, K_i^2, \ldots, K_i^{n_i}\}$. The distanced Out-Neighborhood of K is $OutN_j(K) = \{K_j^1, K_j^2, \ldots, K_j^{n_{ij}}\}$. Let $KS_{n-1}(K_i^j)$ be knowledge status of $K_i^j$ before current submission. The current distance-i in-average of K can be defined by $$I_i(K) = \frac{\sum_{k=1}^{n_i} KS_{n-1}(K_i^k)}{n_i},$$

where the summation is over all learned $KS_i^k$ in $InN_i(K) = \{K_i^1, K_i^2, \ldots, K_i^{n_i}\}$ of K. Similarly, the distance-j out-average of K can be defined as $$O_j(K) = \frac{\sum_{k=1}^{n_j} KS_{n-1}(K_j^k)}{n_j},$$

where the summation is over all learned $K_i^k$ in $OutN_j(K) = \{K_j^1, K_j^2, \ldots, K_j^{n_{ij}}\}$ of K.

The largest number i such that distance-i in-average is larger than 0 is called the in-radius of K. If no such number exists, then none of the prerequisites of K has score larger than 0 and the in-radius of K is 0. Similarly, the largest number j such that distanced out-average is larger than 0 is the out-radius of K.

Suppose that the in-radius of K is n and the out-radius of K is m. If n>0, the learning score $LS_n(K)$ of K that captures how well the learner has mastered prerequisites of K can be defined as $$LS_n(K) = \frac{2}{n(n+1)} \sum_{i=1}^{n} (n-i+1)I_i(K).$$

If n=0, then $LS_n(K)=0$. If m>0, then the Application Score AS(K) of K that captures how well the learner has applied K as a prerequisite in his or her study can be defined as $$AS_n(K) = \frac{2}{m(m+1)} \sum_{i=1}^{m} (m-i+1)I_{n+i}(K).$$

If m=0, then $AS_n(K)=0$.

Learning scores and application scores are not limited to the formulas given above. For curriculum from a specific knowledge domain, appropriate formulas or methods may be used for these scores.

Knowledge Status

Suppose that $KS_{n-1}(K)$ is the knowledge status of K before current submission and the in-radius of K is s, the out-radius of K is t. Then the knowledge status of K can be a scalar based on assessment oriented exponential knowledge status and knowledge prerequisite relationships. For example, the following can be used to calculate knowledge status of K:

If $LS_n(K) > 0$        1)
and $AS_n(K) = 0$,
then $s > 0$ and $KS_n(K) = \left(1 - \frac{1}{2s+2}\right)EKS_n(K) + \frac{1}{2s+2}LS_n(K)$ If $AS_n(K) \geq 0$ and $LS_n(K) > 0$,        2)
then $s > 0, t > 0$,
and
$KS_n(K) =$ $\left(1 - \frac{s+1+(t+1)^2}{2(s+1)(t+1)^2}\right)EKS_{n-1}(K) + \frac{1}{2s+2}LS_n(K) + \frac{1}{2(t+1)^2}AS_n(K)$ If $LS_n(K) = 0$,        3)
then $KS_n(K) = \left(1 - \frac{1}{(2t+2)^2}\right)EKS_n(K) + \frac{1}{(2t+2)^2}AS_n(K)$ Knowledge status is not limited to the formula given above. For curriculum from a specific knowledge domain, appropriate formula or method may be used for knowledge status.

Cognitive Knowledge Status

Using pedagogic categories associated with each knowledge point in a curriculum, knowledge status for a specific pedagogic category can be calculated. Such cognitive knowledge status can be calculated using the same formulas for calculating knowledge status. For a specific pedagogic category, the formula for knowledge status will use only those knowledge points related to the submission and that are associated to the specific category. For example, to calculate cognitive knowledge status for synthesis, the knowledge status will use learning score $$LS_n(K) = \frac{2}{n(n+1)} \sum_{i=1}^{n} (n-i+1)I_i(K)$$

and application score $$AS_n(K) = \frac{2}{m(m+1)} \sum_{i=1}^{m} (m-i+1)I_{n+i}(K),$$

where $I_i(K)$ and $I_{n+1}(K)$ will count only knowledge points that has category synthesis.

FIG. 15 illustrate dependency relation among values calculated above.

Personal Knowledge Profile

In present invention, all information and data needed for calculate and update learner's knowledge value and knowledge status are kept. Besides supporting knowledge diagnosis for assessment submission, personal knowledge profile also allows the present invention to provide instructor and leaner teaching and learning assistance based on learners' personal knowledge status.

The intelligence of the present invention resides in the personal knowledge profile. Since a learner's knowledge status of a knowledge point evolves when learner progress in the curriculum. The knowledge status represent the latest mastery level of a learner, not just what the learner had at the time of taking an assessment.

The personal knowledge profile will have the following knowledge values associated with each knowledge point in the curriculum for each submission:
1) Objective Values $\{OV_n(K)\}$ and Weighted Objective Value $\{WOV_n(K)\}$ based on permitted assessment or self-practice, where index n corresponding to the nth such submission;
2) Prerequisite Values $\{PV_n(K)\}$ based on permitted assessment or self-practice, where index n corresponding to the nth such submission;
3) Error Values $\{EV_n(K)\}$ based on permitted assessment or self-practice, where index n corresponding to the nth such submission;
4) Deficiency Values $\{DV_n(K)\}$ based on objective values $\{OV_n(K)\}$ and assessment error values $\{EV_n(K)\}$;
5) Adjusted Prerequisite Values $\{APV_n(K)\}$ based on prerequisite values $\{PV_n(K)\}$;
6) Adjusted Objective Values $\{AOV_n(K)\}$ based objective values $\{OV_n(K)\}$;
7) Exponential Knowledge Scores $\{EKS_n(K)\}$ based on adjusted prerequisite values $\{APV_n(K)\}$, adjusted objective values $\{AOV_n(K)\}$, and deficiency values;
8) Learning Scores $\{LS_n(K)\}$ based on exponential knowledge values of all prerequisites of K;
9) Application Scores $\{AS_n(K)\}$ based on exponential knowledge values of knowledge states having K as prerequisites;
10) Knowledge Status $\{KS_n(K)\}$ based on learning scores $\{LS_n(K)\}$ and application scores $\{AS_n(K)\}$;

If cognitive knowledge status is evaluated, it will also be saved in the personal knowledge profile along with all values listed above.

Tutoring and Learning Assistance

The present invention provides assistance to instructional planning to instructors and intelligent tutoring and learning assistance to learners. The main tutoring and learning assistance from the prevent invention is delivered through various reports, knowledge map, and study guides based on learners' knowledge status and knowledge history.

Reports, Knowledge Maps, and Study Guides

Summative Assessment Reports

The present invention can generate summative assessment reports on a single assessment, a set of assessment, or set of assessment items. The following are examples of summative assessment reports that
1) Performance summary for a group of learners on selected assessments;
2) Performance summary for a learner on all assessments;
3) Performance summary for all learners on one assessment;
4) Detail report of a learner on a specific assessment;
5) Item analysis for a group of learners on one or a plurality of assessments.

Such reports are typical in most learning management systems and provide basic information to instructors and learners. FIG. 16 illustrates a summative assessment report for a group of learners. FIG. 17 illustrates a summative assessment report for a single learner.

Formative Assessment Reports

The present invention can also provide formative assessment report based on learner's assessment submission and assessment objectives and pedagogic categories.

Formative assessment reports provide learner's performance on learning goals in the curriculum. Objective values calculated above as well as pedagogic categories associated with objectives of assessment items can be used for such reports. The present invention can generate, for example, not limited to, formative type reports as following:
1) (Weighted) objective values of objectives in a specific assessment for selected learners: This is the most common type of formative assessment report focusing on selected learning goals;
2) (Weighted) objective value history for a selected set of knowledge points for selected learners.

FIG. 18 illustrates an example of formative assessment report for a selected set of knowledge points for a learner.

Knowledge Reports

The present invention provides various knowledge reports to assist instruct tor in instructional planning and teaching, assist learner in different phases of learning. Knowledge reports focus on learner's knowledge mastery status. They are based on assessment and knowledge values in learner's personal knowledge profile.

A knowledge report comprises, not limited to, the following information:
1) Learner's knowledge status on objectives and prerequisites of an assessment;
2) Learner's knowledge status on a set of knowledge points for one or a group of learners.
3) Learner's knowledge status for all knowledge points of the curriculum.

FIG. 19 illustrates an example of knowledge report for a set of knowledge points. FIG. 20 is an example of personal knowledge report that covers all knowledge points in a curriculum.

Knowledge Map

Knowledge map of the present invention provides a way to present knowledge prerequisite relationship and knowledge information, learner knowledge status in graphic format. A knowledge map of knowledge points is similar to a digraph that has related knowledge points as vertex set and arcs corresponding to prerequisite relationship among the knowledge points. It is provide a visual interface for instructors and learners easily identify a learner's knowledge status and areas that need to be worked on.

FIG. 21 is an example of knowledge map on a set of knowledge points, where if knowledge point A is a direct prerequisite of knowledge point B, then in the digraph A is placed vertically higher than knowledge point B in the representation and a directed arc is drawn from A to B. Depend on technologies used to construct and display the knowledge map, knowledge related information can be shown on such interface.

The knowledge map allows instructors and learners to trace prerequisites a every knowledge point in the curriculum. Knowledge status information associated with each knowledge points will help easy identification of knowledge deficiency and remediation focus.

Study Guide

A study guide is a paced step-by-step learning guide with targeted knowledge points and relevant learning resources. A study guide can be produced based on one or multiple assessments, a group of selected knowledge points, a segment of the curriculum, or selected assessment items. A study guide contains knowledge points a learner supposed to mastery and learning resources of these knowledge points. It also contains information on learner's current knowledge status on reach knowledge points.

The following comprises main features and functions of a possible study guide based on knowledge requirement and learner's knowledge status:

1) Knowledge point: Information on all prerequisite knowledge points that learner is supposed to mastery, such as location in the curriculum, learning priority, current knowledge status, relevant importance of study.
2) Learning sequence: A recommended learning sequence of knowledge points to ensure that learner has mastered necessary prerequisites of a knowledge point under study;
3) Knowledge status: Learner's current knowledge status for each knowledge point in the study guide. This information can be used by learner to identify priority among all knowledge points in learning. If the study guide is a summary guide over the class, then knowledge status will represent a class average.
4) Learning resource: Information on learning resources of every knowledge point, such as type, location, related study notes. Such information help learner easily identify means and learning resources helpful for learning;
5) Access to knowledge map: Knowledge map is a visual representations of related knowledge points, prerequisite relationship among knowledge points, and information listed above;
6) Access to related knowledge for deficiency root cause: all learner to trace prerequisites and their knowledge status of each knowledge point to pinpoint root cause of knowledge deficiency;
7) Filter study guide by various fields: provide focused or update study guide for learner.
8) Other relevant controls: Study guides are likely generated online or on a computer in a preferred embodiment. The study guide may have search, editing, print functions associated to it.

FIG. 22 illustrates a study guide generated in an embodiment of the present invention, where the curriculum is based on a textbook.

Study Guide and Knowledge Deficiency Root Cause of a Knowledge Point

It is often that when learner has not mastered a knowledge point adequately, it may not be that the learner has difficult in the said knowledge point itself. It often happens that the weakness or lack of understanding of certain prerequisites of the said knowledge pint is the deficiency root cause. Effectively identify learning deficiency root cause is the key focus of the present invention.

Study guide and knowledge map in the present invention can allow learners to trace back to such root causes. In the example of the study guide in FIG. 22, the name of each knowledge point is enabled as a hyperlink. When a learner clicks on the name of a knowledge point, the present invention provides a similar step-by-step study guide of all prerequisite knowledge point of the said knowledge point together with learner's latest knowledge status and related learning resources. Similar function is available on the knowledge map.

Teaching and Learning Assistance

Based on curriculum framework and learner's knowledge profile, the present invention provides teaching and learning assistance in different phases of instructional planning, teaching, learning, pre-assessment study, and post assessment study. FIG. 35 illustrate a typical teaching and learning workflow. The present invention can provide instructors and learners assistance at every learning phase. The following summarizes teaching and learning assistance that are available from the present invention:

1) Provide assistance to instructors in instruction and assessment planning based on assessment objectives, assessment prerequisite, pedagogic categories, and learners' knowledge mastery status;
2) Provide everyday-learning assistance to learners with step-by-step study guide and learning resources based on curriculum requirement;
3) Provide intelligent pre-assessment assistance to instructors and learners in practices based on assessment objectives, assessment prerequisites, pedagogic categories, and learner's knowledge mastery status;
5) Provide post-assessment remediation assistance to learners based on assessment objectives, knowledge prerequisites, pedagogic classifications, assessment performance, and current knowledge mastery status;

Instructional and Assessment Planning

Providing assistance to instructors in instructional and assessment planning based on assessment objectives, prerequisites, pedagogic classifications, and learners' knowledge mastery status, comprising:

1) Provide assistance in selecting curriculum content, assessment content, and pedagogic categories to identify objective and prerequisite knowledge points for teaching;
2) Generate study guides based on identified knowledge points with information on step-by-step study plans, learning priorities, learners' performance history, knowledge mastery status, relevant teaching and learning resources, and pedagogic categories;
3) Generate reports on learners' performance history, knowledge mastery status, relevant teaching and learning resources, learning priorities, and pedagogic categorizations of any knowledge points in the curriculum.
4) Provide learners' knowledge status to help effective teaching and tutoring.

Everyday-Learning Assistance

The present invention provides daily learning assistance to instructors and learners, comprising:

1) Instructor creates study guide according to teaching plan for selected topics or assessment that may or may be online, with or without curriculum enabled assessment items. Such study guide can be standalone without associated with an online assessment in the learning management system or can be online within a learning management system. When such study guide is available to learner, it will have learner's knowledge status and learning priorities for related knowledge points.
2) Instructor creates study guide for a specific assessment comprises identified curriculum content or assessment items. Each time after creating an assessment, instructor can request a companion study guide. Learner can study such guide to prepare for corresponding assessment based on personal knowledge status and learning priorities on related knowledge points.
3) Leaner can create study guide for self-study based on selected knowledge points. These knowledge points can be selected according learner's knowledge profile for remediation purpose, or can be selected from the curriculum for preview or preparation of an up coming assessment.

Pre-Assessment Learning Assistance

The pre-assessment learning assistance is available from Two types of study guides can be created for pre-assessment study by instructor:

1) Study guide for a specific assessment comprises identified assessment items. Each time after creating an assessment, instructor can request a companion study guide. In a preferred embodiment, a study guide can be generated according to assessment objectives and prerequisites. Learner can study such guide to prepare for corresponding assessment. FIG. 23 illustrates an example of a study guide for each assessment in a learning management system embodiment.

2) Study guide for a set of specified knowledge points for review target for learners. Instructor may select a segment of the curriculum and request the system to generate a companion study guide. The system will generate a study guide according to knowledge points covered by the content and generate a study guide based on related knowledge points.

Learners can create self-study guide for pre-assessment for different scenarios:

1) After knowing what topics will be covered the assessment, the learner can request a study guide according to the topics. The system will generated a study guide according to knowledge points covered by those topics.

2) After knowing what topics will be covered by the assessment, the learner may identify knowledge points that he has not mastered well and request a study guide for selected knowledge points. The system will generate a study guide according to selected knowledge points.

Post-Assessment Remediation Assistance

After an assessment, remediation assistance can be available in two ways:

1) Generating remediation study guide based on assessment report: Since the system generates detailed assessment report, instructor and learners can request remediation study guide based on specific assessment report. The system will generate study guide based on related knowledge pints with information of learner's knowledge status.

2) Generating remediation study guide base on knowledge status: Instructor and learner can request study guide base on specific knowledge points for remediation. Such knowledge points may be selected directly from the cumulative knowledge report.

Self-Practice Assistance

Most learning management systems and quiz engines allow learners to take practice assessment repeatedly until learner mastered required knowledge. The present invention can help learner to identify knowledge deficiency effectively and hence improve learning efficiency.

Each time when leaner submits a practice assessment, the present invention can analyze learner's knowledge status and update latest knowledge status. The study guide for the same practice will be updated with learner's latest knowledge status. Then learner can use updated study guide to identify knowledge points not meeting requirement and related learning resources.

Leaner can also further retrieve knowledge status of all prerequisites of the said knowledge point to identify root cause of the deficiency. After identify the root causes, learner can focus study guide of the said knowledge point to improve learning.

PREFERRED EMBODIMENT

The present invention provides any learning management system with add-on intelligent knowledge diagnosis and tutoring features to learning management system that allows learners to input their assessment results and system to communicate with other system through application programming interface. For learning management systems that allow instructors to create and manage their own assessment, the present invention can provide intelligent features to assist instructors in teaching and assessment planning, and assist learners in daily study, pre-assessment preparation, and post-assessment remediation.

In a preferred embodiment of the present system, system functionalities can be partitioned into functional modules that execute different tasks. FIG. 24 illustrates a partition of functionality of a preferred embodiment of the present invention. It comprises an application programming interface layer M-0, a Curriculum Module M-1, a Knowledge Module M-2, a Tutoring Module M-3, a Report Module M-4, and a Curriculum and Metadata Management Interface module M-5.

In a preferred embodiment, the Curriculum Module M-1 provides end user interface for learning management systems and programs for business logics supporting learning management system and curriculum management. The Knowledge Module M-2 analyzes learner's assessment submissions for performance analysis and knowledge diagnosis. The Knowledge Module M-2 analyzes and updates learner's knowledge values and knowledge status and support features in Tutoring Module M-3 and Reporting Module M-4. The Tutoring Module M-3 provides learning assistance based on curriculum requirement and learner's knowledge status. The Report Module M-4 generates and manages learner's performance and knowledge reports. The Curriculum and Metadata management Interfaces Module M-5 provides interface for subject matter experts to create and manage data in curriculum framework and assessment framework. The Application Programming Interface M-0 manages data and information communications between the present invention and supported learning management systems.

The present invention is a method and system for knowledge diagnosis and tutoring, which is not limited by the embodiment illustrated in FIG. 24. There is no restriction on what technologies should be used to construct such an embodiment to deliver functionalities specified by the present invention. There is no limitation that how the system is partitioned in a particular embodiment from an application architecture point of view. The partition of functional modules illustrated in FIG. 24 is only a logic representation of functionalities. The functionalities are based on method specified in the present invention. The present method is not bound to a specific embodiment.

FIG. 1 illustrates a preferred embodiment of the present system S-2 working as an integrated backend engine to a full featured learning management system S-1. Such integration will allow instructors and learners continuing working in the existing learning management system S-1. New features and functionalities provided by present invention will be available to users through interfaces embedded into the existing learning management system S-1 or interfaces of the learning management system S-1 built upon data from present invention S-2. The Internet N-1 in FIG. 1 can be either or all of Internet, WIFI channels, or other delivery platforms.

FIG. 25 illustrates a preferred embodiment of the present invention working as backend engine of a minimal learning assistant system S-3. Such learning management system may have fewer features than a full featured learning management system. The present system can provide instructor and learner interfaces to instructors and learners directly. The ability of the present invention to support different types of learning management system makes it flexible and cost-effective to suit for different teaching and learning styles and situations.

A preferred embodiment of the present invention system can work with a wide variety of learning management systems, including course management systems, homework management system, assessment management system, and any hybrid of the previously mentioned systems.

An embodiment of the present system can also work as a standalone application using user interfaces inside the present system. The present invention does not require that there must be a learning management system. When there is no learning management system or no online quiz engine to grade learner's assessment results, the present invention can provide interface for learner to input any manually grade results.

A preferred embodiment of the present invention can be located as far as in different locations on the network from where the learning management system is, or as close as on the same server on which the learning management server resides. The internet protocol, such as the ones illustrated in FIG. 1 and FIG. 25, can be any type of technology that facilitates communication between the present invention, the learning management system, and the user.

Application Programming Interface

In a preferred embodiment, the present invention uses Application Programming Interface (API) as technology to facilitate exchanging messages or data between the present invention and other learning management systems. If a preferred embodiment of the present invention acts as a standalone application, it then uses its own user interfaces and any messaging and data transmission will be executed internally within the present system.

The application programming interface of the present invention can utilize any technology that can act as virtual interface support system-level integration of multiple systems and applications. Application programming interfaces and user interfaces provided by the present invention will support a wide range of communications and functions, such as customization of curriculum, parsing system and user information, return messages, data, and package interfaces to learning management systems.

Curriculum Module

Enabling a Curriculum with Curriculum Module

In a preferred embodiment, subject matter experts can use the Curriculum and Metadata Management Module M-0 to input and manage curriculum framework and assessment framework of a curriculum. Curriculum framework and assessment framework data will be saved in the Curriculum Repository M-1-4.

Subject matter experts enable a curriculum include:

1) define content taxonomy and pedagogic taxonomy of the given curriculum;

2) define resource taxonomy and other relevant metadata taxonomies for the given curriculum and learning content;

3) identify curriculum knowledge points and learning resources of the curriculum and assign each element a unique identifier;

4) associate appropriate categories and terms to all knowledge points and learning resources;

5) identify prerequisite relationships among knowledge points of the given curriculum;

6) identify relevant learning resources for each knowledge point of the given curriculum;

7) identify objectives and prerequisites for assessment items of the given curriculum and assign each assessment item a unique identifier;

8) identify objective scalars and prerequisite distributions for selected assessment items;

Enabling a curriculum generates a wealth set of metadata that associated with the curriculum knowledge points and curriculum assessment items stored in Curriculum Repository M-1-3. The Curriculum Repository can be any relational database, or non-structural data repository, or any other data repository that can store and retrieve knowledge related metadata and information.

Customize a Curriculum

In a preferred embodiment, the Curriculum Module is able to provide the learning management system available curricula in the present system through application programming interface M-0. Instructors can utilize learning management system interface or interfaces M-1-1 in the Curriculum Module to select a curriculum for their courses.

The structure and properties of curriculum framework allows removing knowledge points, assessment items, and related learning resources from a curriculum. The only thing instructor needs to be aware of is that removing a set of knowledge points may leave learner without enough prerequisite knowledge in learning. Therefore, by providing necessary warnings and options, the present system supports customizing a curriculum easily for individual instructors. Instructors may select knowledge points, assessment items, and learning resources to be used for different course settings. After customization, performance analysis, reporting, and learning assistance can be executed based on remaining knowledge points and assessment items in the customized curriculum.

FIG. 26 illustrates an interface in Curriculum Module for choosing curriculum knowledge. FIG. 27 illustrates the next step in the same interface for choosing assessment items. FIG. 28 illustrates the final step of customizing learning resources and learning priorities.

Knowledge Module

In a preferred embodiment, the Knowledge Module of the present invention analyzes learner assessment results, calculates learner knowledge status, and manages learner's knowledge level and knowledge profile.

Assessment Result Submissions

The Knowledge Module of the present invention accepts learner's graded assessment results from integrated learning management system and analyzes learner's assignment performance on knowledge points covered by the assessment. The only required data for an assessment item in an assessment submission for the present invention is if the learner has answered a question correctly or not.

The Knowledge Module in an embodiment of the present invention can work with one or more learning management systems deployed at different location with different technology and configurations. A learning management system can submit grade assessment results to the Knowledge Module. Learners can complete their assignment in any learning management system that can transmit grade assignment results to the present invention. Also, the present invention does not require learners to complete their assignments in a learning management system, or even online. Learners can submit their graded results though any devices such as, not limited to, PDA and cellular phones that are able to transmit assignment results to the present invention using interface M-2-1.

In a learning management system supported by an embodiment of the present invention, curriculum related assessments are presented to students either as online assessment backed by online quiz engines, or as learning activities linked to interfaces for students to submit graded results. Depending on how such assessment will be administered by instructors and completed by learners, learner's work may be graded by a quiz engine automatically, by an instructor manually, or by other process. In a learning management system, usually graded results will be transmitted to the Knowledge Module through application programming interface M-0 by the learning management system.

If an assessment is graded by an online quiz engine integrated with the present invention, then graded results can be passed to Knowledge Module though application programming interfaces M-0. If an assessment is graded by instructor manually, or other applications that are not integrated with the present invention, then the learner can submit graded results through user interfaces M-2-1 to the Knowledge Module. If an assessment is a learner's self-practice and learner has identified his or her own results are correct or wrong, the learner can also submit such information to the Knowledge Module.

Assessment Results Format

In a preferred embodiment of the present invention, when graded assessment results is transmitted to the present invention, the assessment results can be plain or encrypted text string, HTML form data, XML packages, or other data format. For better interoperability with a wide range of learning management systems, quiz engines, it is desired that the assessment results in submitted to Knowledge Module in XML format. FIG. 29 illustrates graded assessment results in XML from a quiz engine.

In a full featured learning management system, a learner may take assessment online and submit results for automated or manual grading. Formatted assessment results can then be transmitted to the Knowledge Module M-2 by the learning management system.

If a preferred embodiment of the present invention is used as a standalone system, learner may enter and submit graded assessment results using Knowledge Module user interfaces M-2-1. The user interface will pass such submission through Application Programming Interface M-0. Assessment results will be reformatted and then send to the Knowledge Module M-2.

Required Assessment Information

In a preferred embodiment, besides correctness of learner's response on each assessment item, the present invention also require some other data form to support integration with learning management system, user identification, and other security requirement. Formatted assessment results will normally include, but not limited to, the following information:

1) System and user information: system ID, learner ID, curriculum ID, class ID

2) Assessment information: assessment ID, assessment source ID, assessment type, assessment submission time, attempt type, attempt count, etc.

3) Assessment item Information: item ID, item source ID, item type, item response, correctness, item status, and item sequence number.

System ID and user ID are for the identification of the system and user from where the submission is originated. Curriculum ID identifies the curriculum that the assessment is associated with. Class ID identifies a specific class that the learner belongs. Customized curriculum ID identifies if and which customized curriculum is used for the class.

The assessment source ID identifies where the assessment is managed and administered to the learner. The assessment ID can be a unique identifier of the assessment in the source system. The assessment type identifies that the assessment is an instructor assigned and allowed submission or a learner's self-practice. The submission time identifies when the submission is made. The attempt type indicates that if the submission should be counted for assessment knowledge values or for practice knowledge values. The attempt count identifies that how many times that the learner submitted the same assessment.

Item source ID identifies where an assessment item is originated. Item ID is from the assessment source system. Correctness indicates that learner has failed or succeeded on the item, which is often given by assessment engine during grading. The other parameters are optional for the present invention. Learner's specific response to each assessment item is not required for the present invention. Such information may be used in knowledge analysis, but is not always required.

Parse Assessment Objectives and Prerequisites

In a preferred embodiment, every time an assessment is submitted to the present invention from an integrated learning management system, the Knowledge Module M-2 verifies if the assessment has been parsed or not. If the assessment is parsed before, then Knowledge Module can retrieve assessment objectives and prerequisites directly and continue to knowledge diagnosis. If the assessment has not been parsed before, then Knowledge Module M-2 will parse the assessment results to identify assessment objectives and prerequisites.

When graded assessment results are submitted to Knowledge Module M-2 the first time, Knowledge Module retrieves objective and prerequisite knowledge points, associated objective scalars and prerequisite distributions from the Curriculum Module M-1.

The Knowledge Module saves objectives, prerequisites, objective scalars, and prerequisite distributions for each assessment in the Knowledge Repository. When an assessment is submitted again, the Knowledge Module will retrieve assessment objectives, prerequisites, objective scalars, and prerequisite distributions from Knowledge Repository M-2-3 directly.

Knowledge Diagnosis

In a preferred embodiment of the present invention, the Knowledge Module calculates learner's knowledge values based on submitted assessment results. Calculated values will be saved to learner's knowledge profile. Reports and learning assistance will then be available through Report Module M-4 and Tutor Module M-3.

The Knowledge Module performs calculations based on learner's current submission and knowledge history. Different from existing summative or formative assessment systems that evaluate learner's overall performance on the assessment or on specific learning outcomes, the present invention evaluates learner performance on both learning outcomes and learning deficiency. Hence the present invention can help learner to identify root causes of errors.

The following knowledge values associated with each knowledge point in the curriculum will be calculated in the Knowledge Module and then saved in the Knowledge Module Repository:

1) Objective Values $\{OV_n(K)\}$ and Weighted Objective Value $\{WOV_n(K)\}$ based on permitted assessment or self-practice, where index n corresponding to the nth such submission;

2) Prerequisite Values $\{PV_n(K)\}$ based on permitted assessment or self-practice, where index n corresponding to the nth such submission;

3) Error Values $\{EV_n(K)\}$ based on permitted assessment or self-practice, where index n corresponding to the nth such submission;

4) Deficiency Values $\{DV_n(K)\}$ based on objective values $\{OV_n(K)\}$ and assessment error values $\{EV_n(K)\}$;

5) Adjusted Prerequisite Values $\{APV_n(K)\}$ based on prerequisite values $\{PV_n(K)\}$;

6) Adjusted Objective Values $\{AOV_n(K)\}$ based objective values $\{OV_n(K)\}$;

7) Exponential Knowledge Scores $\{EKS_n(K)\}$ based on adjusted prerequisite values $\{APV_n(K)\}$, adjusted objective values $\{AOV_n(K)\}$, and deficiency values;

8) Learning Scores $\{LS_n(K)\}$ based on exponential knowledge values of all prerequisites of K;

9) Application Scores $\{AS_n(K)\}$ based on exponential knowledge values of knowledge states having K as prerequisites;

10) Knowledge Status $\{KS_n(K)\}$ based on learning scores $\{LS_n(K)\}$ and application scores $\{AS_n(K)\}$;

If cognitive knowledge status are evaluated, they will also be saved.

Report Module

Most of learning management systems is able to provide basic summative reports. Some systems also provide more detail reports on item analysis and learning outcome analysis close to formative assessment reports. Some formative assessment systems provide both summative and formative assessment reports. In a preferred embodiment, the present invention can provide not only summative and formative assessment reports, but also knowledge reports.

In a preferred embodiment, upon receiving request from integrated learning management system, the Report Module M-4 sends request to the Knowledge Module M-2 to retrieve knowledge values of selected assessments or knowledge points for one or for a group of learners. After receiving response from Knowledge Module, the Report Module format received data according to learning management system request and send formatted data back to the learning management system. The learning management system can use such formatted data to construct corresponding reports.

The Report Module User Interfaces M-4-1 can also generate reports and present to user directly in a preferred embodiment.

Summative Assessment Reports

In a preferred embodiment, the Report Module M-4 can generate summative assessment reports on a single assessment, a set of assessment, or set of assessment items. The following are examples of summative assessment reports that 1) Performance summary for a group of learners on selected assessments;

2) Performance summary for a learner on all assessments;

3) Performance summary for all learners on one assessment;

4) Detail report of a learner on a specific assessment;

5) Item analysis for a group of learners on one or a plurality of assessments.

Such reports are typical in most learning management systems and provide basic information to instructors and learners. FIG. 16 illustrates a summative assessment report for a group of learners. FIG. 17 illustrates a summative assessment report for a single learner.

Formative Assessment Reports

In a preferred embodiment, the Report Mudule can also provide formative assessment report based on learner's assessment submission and assessment objectives and pedagogic categories.

Formative assessment reports provide learner's performance on learning goals in the curriculum. Objective values calculated above as well as pedagogic categories associated with objectives of assessment items can be used for such reports. The present invention can generate, for example, not limited to, formative type reports as following:

1) (Weighted) objective values of objectives in a specific assessment for selected learners: This is the most common type of formative assessment report focusing on selected learning goals;

2) (Weighted) objective value history for a selected set of knowledge points for selected learners.

FIG. 18 illustrates an example of formative assessment report for a selected set of knowledge points for a learner.

Knowledge Reports

In a preferred embodiment, the Report Module can generate various knowledge reports to assist instructor in instructional planning and teaching, assist learner in different phases of learning. Knowledge reports focus on learner's knowledge mastery status. They are based on assessment and knowledge values in learner's personal knowledge profile.

A knowledge report may contain, not limited to, the following information:

1) Learner's knowledge status on objectives and prerequisites of an assessment;

2) Learner's knowledge status on a set of knowledge points for one or a group of learners.

3) Learner's knowledge status for all knowledge points of the curriculum.

In a preferred embodiment integrated with a learning management system, instructor can invoke a knowledge report from the learning management system S-1. The learning management system sends request to Report Module M-4 of the present invention through Application Programming Interface M-0. The Report Module retrieve knowledge data from the Knowledge Repository M-2-3 and return data back to learning management system S-1. Learning management system S-1 then present instructor with knowledge report. FIG. 19 illustrates an example of knowledge report for a set of knowledge points. FIG. 20 illustrate an example of personal knowledge report that covers all knowledge points in a curriculum.

Knowledge Map

Knowledge map of the present invention provides a way to present knowledge prerequisite relationship and knowledge information, learner knowledge status in graphic format. A knowledge map of knowledge points is similar to a digraph that has related knowledge points as vertex set and arcs corresponding to prerequisite relationship among the knowledge points. It is provide a visual interface for instructors and learners easily identify a learner's knowledge status and areas that need to be worked on.

FIG. 21 is an example of knowledge map on a set of knowledge points, where if knowledge point A is a prerequisite of knowledge point B, then in the digraph A is placed vertically higher than knowledge point B in the representation and a directed arc is drawn from A to B. Depend on technologies used to construct and display the knowledge map, knowledge related information can be shown on such interface.

In a preferred embodiment integrated with a learning management system, instructor can invoke a knowledge map from the learning management system S-1. The learning management system sends request to Report Module M-4 of the present invention through Application Programming Interface M-0. The Report Module retrieve knowledge data from the Knowledge Repository M-2-3 and return data back to learning management system S-1. Learning management system S-1 then present instructor with knowledge report. FIG. 19 illustrates a simple knowledge map for a set of knowledge points.

Tutor Module

Study Guides

The main tutoring and learning assistant from the prevent invention is study guides generated based on learner's latest performance and knowledge status. In a preferred embodiment, the present invention provides various study guides to assist instructors teaching and learner's learning.

In a preferred embodiment, a study guide is a paced step by step learning guide with targeted knowledge points and relevant learning resources. A study guide can be produced based on one or multiple assessments, a group of selected knowledge points, a segment of the curriculum, or selected assessment items enabled for the curriculum. A study guide also contains information on past and current knowledge status of a learner or a group of learners. When a study guide is presented to user, various controls can be available for user to make changes, print out the study guide, or create study notes.

The following are main features and functions of a possible study guide based on knowledge requirement and learner's knowledge status:

1) Knowledge point: Information on all prerequisite knowledge points that learner is supposed to mastery, such as location in the curriculum, learning priority, current knowledge status, relevant importance of study.

2) Learning sequence: A recommended learning sequence of knowledge points to ensure that learner has mastered necessary prerequisites of a knowledge point under study;

3) Knowledge status: Learner's current knowledge status for each knowledge point in the study guide. This information can be used by learner to identify priority among all knowledge points in learning. If the study guide is a summary guide over the class, then knowledge status will represent a class average.

4) Learning resource: Information on learning resources of every knowledge point, such as type, location, related study notes. Such information help learner easily identify means and learning resources helpful for learning;

5) Access to knowledge map: Knowledge map is a visual representations of related knowledge points, prerequisite relationship among knowledge points, and information listed above;

6) Access to related knowledge for deficiency root cause: Provide user information on related knowledge points of each knowledge point to pinpoint root cause of knowledge deficiency;

7) Filter study guide by various fields: provide focused or update study guide for learner.

8) Other relevant controls: Study guides are likely generated online or on a computer in a preferred embodiment. The study guide may have search, editing, print functions associated to it.

In a preferred embodiment integrated with a learning management system, instructors and learners can invoke a study guide from the learning management system S-1. The learning management system sends request to Tutor Module M-2 of the present invention through Application Programming Interface M-0. The Tutor Module retrieve knowledge data from the Knowledge Repository M-2-3 and return data back to learning management system S-1. Learning management system S-1 then present instructor with knowledge report. FIG. 22 illustrates a simple study guide for a set of knowledge points.

Learning with Study Guide

It is often that when learner has not mastered a knowledge point adequately, it may not be that the learner has difficult in the said knowledge point itself. It often happens that the weakness or lack of understanding of certain prerequisites of the said knowledge pint is the deficiency root cause. Effectively identify learning deficiency root cause is the key focus of the present invention.

Study guide and knowledge map in the present invention can allow learners to trace back to such root causes. In the example of the study guide in FIG. 22, the name of each knowledge point is enabled as a hyperlink. When a learner clicks on the name of a knowledge point, the Tutor Module of the present invention provides a similar step-by-step study guide of all prerequisite knowledge point of the said knowledge point together with learner's latest knowledge status and related learning resources. Similar function is available on the knowledge map.

Study Guide Editor

In a preferred embodiment, the Tutor Module provides data and information for learning management system to construct a Study Guide Editor. The learning management system can create its own user interface for the study guide editor, or can embed user interface delivered by the Tutor Module through the application interface. A Study Guide Editor allows instructor and learners to create and manage study guides for a class, or for an individual. Instructors can manage assignment specific study guides or study guides based on selected knowledge points or questions; learners can create and manage self-study guide based his or her own knowledge status, learning needs and learning style.

FIG. 30 demonstrates an example of general workflow of creating a study guide using study guide editor by an instructor or student in a preferred embodiment. When called at different scenario by different types of users, the workflow may vary. Some of the workflows will be introduced in creating different study guides in the rest of this invention.

The Study Guide Editor retrieves curriculum structure, assessment items, and learning resource information from the Curriculum Module M-1. Study guide data will be saved in Study Guide Repository M-3-3 in the Tutoring Module.

FIGS. 31, 32, 33 and 34 demonstrate examples of interface realizations of above mentioned workflow in a preferred embodiment. FIG. 31 shows the interface of Step 1 of creating basic information of a study guide. FIG. 32 shows the interface of Step 2 of selecting study guide content coverage. FIG. 33 shows the interface of Step 2 of selecting assessment items as part of content coverage. FIG. 34 shows the interface of Step 3 of customizing learning resources of the study guide.

Teaching and Learning Assistance

In a preferred embodiment, based on curriculum framework and learner's knowledge profile, the present invention provides teaching and learning assistance in different phases of instructional planning, teaching, learning, pre-assessment study, and post assessment study.

FIG. 35 illustrate a typical teaching and learning workflow. A preferred embodiment of the present invention can provide instructors and learners assistance at every learning phase. The following summarizes teaching and learning assistance that are available from the present invention:

1) Instructional and assessment planning: Provide assistance to instructors in instruction and assessment planning based on assessment objectives, assessment prerequisite, pedagogic categories, and learners' knowledge mastery status;

2) Everyday-learning assistance: Provide everyday-learning assistance to learners with step-by-step study guide and learning resources based on curriculum requirement;

3) Pre-assessment learning assistance: Provide intelligent pre-assessment assistance to instructors and learners in practices based on assessment objectives, assessment prerequisites, pedagogic categories, and learner's knowledge mastery status;

4) Post-assessment learning assistance: Provide post-assessment remediation assistance to learners based on assessment objectives, knowledge prerequisites, pedagogic classifications, assessment performance, and current knowledge mastery status;

5) Self-practice assistance: Provide instant knowledge analysis, knowledge report, and knowledge status based study guide that intelligently help learner focus on knowledge deficiency.

Instructional and Assessment Planning

In a preferred embodiment, instructor can use various reports provided by the present invention to assist instructional and assessment planning based on curriculum requirement and learners' knowledge status, comprising:

1) Select curriculum content, assessment content, and pedagogic categories to identify objective and prerequisite knowledge points for teaching: Instructor can invoke a knowledge report or knowledge map from the learning management system S-1.

2) Generate study guides based on identified knowledge points with information on step-by-step study plans, learning priorities, learners' performance history, knowledge mastery status, relevant teaching and learning resources, and pedagogic categories;

3) Generate reports on learners' performance history, knowledge mastery status, relevant teaching and learning resources, learning priorities, and pedagogic categorizations of any knowledge points in the curriculum.

4) Provide learners' knowledge status to help effective teaching and tutoring.

Everyday-Learning Assistance

The present invention provides daily learning assistance to instructors and learners, comprising:

1) Instructor creates study guide according to teaching plan for selected topics or assessment that may or may be online, with or without curriculum enabled assessment items. Such study guide can be standalone without associated with an online assessment in the learning management system or can be online within a learning management system. When such study guide is available to learner, it will have learner's knowledge status and learning priorities for related knowledge points.

2) Instructor creates study guide for a specific assessment comprises identified curriculum content or assessment items. Each time after creating an assessment, instructor can request a companion study guide. Learner can study such guide to prepare for corresponding assessment based on personal knowledge status and learning priorities on related knowledge points.

3) Leaner can create study guide for self-study based on selected knowledge points. These knowledge points can be selected according learner's knowledge profile for remediation purpose, or can be selected from the curriculum for preview or preparation of an up coming assessment.

Pre-Assessment Learning Assistance

The pre-assessment learning assistance is available from Two types of study guides can be created for pre-assessment study by instructor:

1) Study guide for a specific assessment comprises identified assessment items: In a preferred embodiment, when an instructor creates an assessment in the learning management system with assessment items enabled in the curriculum, he may request for a companion study guide for learners. The learning management system then sent assessment item IDs and related information such as class ID, assessment ID, instructor ID and other related information to Tutor Module through application programming interface M-0. The Tutor Module will pass assessment information and assessment item IDs to the Knowledge Module to extract objectives and prerequisites of assessment items. Assessment objectives and prerequisites will be saved in the Knowledge Repository with the assessment information. Finally, the Tutor Module will notify the learning management system that a study guide is ready for the corresponding assessment. A means such as hyperlink will be available to an eligible user to access the study guide at proper location and time, controlled by the learning management system.

2) Study guide for a set of specified knowledge points for review target for learners: Instructor may select a segment of the curriculum and request the system to generate a companion study guide. The system will generate a study guide according to knowledge points covered by the content and generate a study guide based on related knowledge points.

Learners can create self-study guide for pre-assessment for different scenarios:

1) After knowing what topics will be covered the assessment, the learner can request a study guide according to the topics. The system will generated a study guide according to knowledge points covered by those topics.

2) After knowing what topics will be covered by the assessment, the learner may identify knowledge points that he has not mastered well and request a study guide for selected knowledge points. The system will generate a study guide according to selected knowledge points Post-Assessment Remediation Assistance In a preferred embodiment, after an assessment, remediation assistance can be available in two ways:

1) Generating remediation study guide based on assessment report: Since the system generates detailed assessment report, instructor and learners can request remediation study guide based on specific assessment report. The system will generate study guide based on related knowledge pints with information of learner's knowledge status.

2) Generating remediation study guide base on knowledge status: Instructor and learner can request study guide base on specific knowledge points for remediation. Such knowledge points may be selected directly from the cumulative knowledge report.

Self-Practice Assistance

Most learning management systems allow learners to take practice assessment repeatedly until learner mastered required knowledge. The present invention can help learner to identify knowledge deficiency effectively and hence improve learning efficiency.

In a preferred embodiment, each time when leaner submits a practice assessment, the learning management system can send learner's result to Knowledge Module through application programming interface. The Knowledge Module analyzes learner's knowledge status and update latest knowledge status. The study guide for the same practice will be updated with learner's latest knowledge status. Then learner can use updated study guide from the Tutor Module to identify knowledge points not meeting requirement and related learning resources.

Leaner can also further retrieve knowledge status of all prerequisites of the said knowledge point to identify root cause of the deficiency. After identify the root causes, learner can focus study guide of the said knowledge point to improve learning.

What is claimed is

1. A method for knowledge diagnosis and tutoring based on knowledge prerequisite relationships of a curriculum, comprising:

a) applying, on a server, a curriculum framework and an assessment framework to a curriculum, the curriculum including a learning objective to be measured, the learning objective comprising a plurality of knowledge points to be mastered by a learner;

b) determining that mastery of a first knowledge point and mastery of a second knowledge point of the learning objective are each prerequisites to mastery of a third knowledge point of the learning objective, wherein mastery of the first and second knowledge points are not prerequisites to mastery of each other;

c) parsing, with the server, an assessment to be completed by the learner, the assessment comprising a plurality of assessment items that tests the learner's mastery status of the learning objective;

d) identifying an objective of the assessment, the objective of the assessment corresponding to one or more of the plurality of knowledge points to be mastered by the learner;

e) identifying, with the server, that a particular assessment item of the plurality of assessment items tests the learner's mastery of the third knowledge point;

f) identifying, with the server, that the first and second knowledge points are required to solve the particular assessment item that tests the learner's mastery of the third knowledge point;

g) providing, with the server, pre-assessment learning assistance to the learner based on the objective of the assessment, the learner's mastery of the first and second knowledge points, and the learner's mastery status of the learning objective;

h) evaluating the learner's performance on the particular assessment item tested on the assessment;

i) identifying a first statistical distribution for the particular assessment item indicative of a probability that the learner's deficiency in mastery of the first knowledge point is a potential root cause of the learner's failure on the assessment item that tests the learner's mastery of the third knowledge point;

j) identifying a second statistical distribution for the particular assessment item indicative of the probability that the learner's deficiency in mastery of the second knowledge point is the potential root cause of the learner's failure on the assessment item that tests the learner's mastery of the third knowledge point;

k) determining, as a function of the first and second statistical distributions for the particular assessment item, that the learner's deficiency in mastery of the first knowledge point and not the second knowledge point is the root cause of the learner's failure on the assessment item that tests the learner's mastery of the third knowledge point;

l) updating the learner's mastery status for the learning objective based on the objective of the assessment, the learner's mastery of the first and second knowledge points, the learner's performance on the particular assessment item on the assessment, and a historical mastery status of the learner for the learning objective;

m) providing, with the server, post-assessment remediation learning assistance to the learner based on the objective of the assessment, the learner's mastery of the first knowledge point, and the learner's mastery status of the learning objective; and n) providing, with the server, learning assistance personalized for the learner based on the objective of the assessment, the learner's mastery of the first knowledge point or the second knowledge point, and the learner's mastery status of the learning objective.

2. The method of claim 1, wherein applying a curriculum framework and an assessment framework to a curriculum, comprising:

a) applying the curriculum framework to the curriculum according to a content taxonomy, a pedagogic taxonomy, and other related taxonomies to the curriculum, the pedagogic taxonomy comprising one or more learning resources corresponding to the curriculum; and b) applying the assessment framework to the curriculum based on the curriculum framework to represent learning objectives and requirements of the curriculum.

3. The method of claim 2, wherein the content taxonomy comprising a set of hierarchical categories to represent the content structure of the plurality of knowledge points of the curriculum, each category of the content taxonomy associated with one or more terms; wherein the pedagogic taxonomy comprising a set of hierarchical categories to describe pedagogic attributes of the plurality of knowledge points, the learning resources, and the plurality of assessment items of the curriculum, each category of the pedagogic taxonomy associated with one or more terms; and wherein the other related taxonomies comprising at least one of a desired and suitable learning preference taxonomy to define learning priorities, a semantic taxonomy to facilitate searching functionalities, and a learning resource taxonomy to classify learning resources.

4. The method of claim 2, wherein applying the curriculum framework according to a content taxonomy, a pedagogic taxonomy, and other related taxonomies, comprising:

a) assigning content of the curriculum with a hierarchical structure according to the content taxonomy of the curriculum;

b) associating each knowledge point of the plurality of knowledge points of the curriculum with the one or more learning resources corresponding to the curriculum; and c) assigning relevant taxonomy categories and terms to the plurality of knowledge points of the curriculum and the one or more learning resources corresponding to the curriculum.

5. The method of claim 4, wherein assigning content of the curriculum with a hierarchical structure according to the content taxonomy of the curriculum, comprising:

a) assigning a learning objective of curriculum to curriculum content segments, each curriculum content segment comprising observable learner behavior or learner performance used to make judgments about the learner's learning progress in the curriculum; and b) assigning each of the knowledge points of the curriculum to curriculum content segments that are sub-segments of the learning objective, each sub-segment represents a minimum measurable learning behavior and level of performance in the curriculum.

6. The method of claim 4, wherein associating each knowledge point of the plurality of knowledge points of the curriculum with the one or more learning resources corresponding to the curriculum comprising associating each knowledge point of the plurality of knowledge points with the one or more learning resources corresponding to the curriculum regardless of their media format and presentation environment.

7. The method of claim 4, wherein assigning relevant taxonomy categories and terms to the plurality of knowledge points of the curriculum and the one or more learning resources corresponding to the curriculum comprising associating each knowledge point of the plurality of knowledge points and each learning resource of the one or more learning resources with one or more pedagogic categories and terms and one or more categories and terms from at least one of a learning preference taxonomy, a semantic taxonomy, and a learning resource taxonomy of the curriculum.

8. The method of claim 2, wherein applying the assessment framework to the curriculum, comprising:

a) identifying a prerequisite knowledge point and a prerequisite distribution for each knowledge point of the plurality of knowledge points of the curriculum;

b) identifying an objective knowledge point and an objective scalar for each assessment item on the assessment;
c) identifying a prerequisite knowledge point and a prerequisite distribution for each assessment item of the curriculum; and
d) identifying one or more categories and terms for at least one of the pedagogic taxonomy, a semantic taxonomy, and a learning preference taxonomy for each assessment item on the assessment.

9. The method of claim 8, wherein identifying a prerequisite knowledge point and a knowledge prerequisite distribution for each knowledge point of the plurality of knowledge points of the curriculum, comprising:
  a) identifying a relationship between a pair of knowledge points that explicitly requires mastery of one knowledge point in the pair to master the other knowledge point in the pair; and
  b) identifying a statistical distribution corresponding to the relevance of the learner's deficiency in mastering one knowledge point in the pair of knowledge points.

10. The method of claim 8, wherein identifying an objective knowledge point and an objective scalar for each assessment item on the assessment, comprising identifying a scalar between 0 and 1 for the objective knowledge point for the assessment item to describe the relevance of the assessment item in testing the learner's mastery of the knowledge point.

11. The method of claim 1, further comprising:
  a) providing, with the server, a customizable curriculum framework a customizable assessment framework that supports customizing teaching content, learning resources, and assessment items;
  b) generating, with the server, a study guide as teaching and review plan, the study guide comprises step-by-step study plans, relevant learning resources, learning priorities, the learner's mastery status of the learning objective, and one or more pedagogic categories;
  c) determining, with the server, the learner's progress in the curriculum; and
  d) generating reports of the learner's mastery status in the curriculum and the learner's deficiency in mastering one or more knowledge points.

12. The method of claim 1, wherein providing, with the server, pre-assessment learning assistance to the learner based on the objective of the assessment, the learner's mastery of the first and second knowledge points, and the learner's mastery status of the learning objective, comprising:
  a) generating, with the server, a study guide based on the objective of the assessment and the learner's mastery of the first and second knowledge points, the study guide comprising step-by-step study plans, learning priorities, the learner's mastery status of the learning objective, relevant learning resources, and one or more pedagogic categories; and
  b) generating reports of the learner's mastery status of the learning objective and the learner's deficiency in mastering one or more knowledge points.

13. The method of claim 1, wherein evaluating the learner's performance on the particular assessment item tested on the assessment and updating the learner's mastery status based on the objective of the assessment, the learner's mastery of the first and second knowledge points, the learner's performance on the particular assessment item on the assessment, and a historical mastery status of the learner for the learning objective, comprising:
  a) calculating an assessment objective value for the learner for the third knowledge point;
  b) calculating an assessment prerequisite value for the learner for each of the first and second knowledge points;
  c) calculating a deficiency value for the learner corresponding to the third knowledge point;
  d) calculating an adjusted objective value for the third knowledge point and an adjusted prerequisite value for each of the first and second knowledge points based on the learner's historical assessment performance corresponding to the first, second, and third knowledge points;
  e) calculating an exponential knowledge score for the learner based on the adjusted objective value of the third knowledge point and the adjusted objective prerequisite value of each of the first and second knowledge points;
  f) calculating a learning score and an application score for the learner based on determining that mastery of the first and second knowledge points of the learning objective is required to master the third knowledge point, and a historical mastery status of the learner for the learning objective; and
  g) calculating the learner's mastery status based on the learning score and the application score.

14. The method of claim 1, wherein providing, with the server, post-assessment remediation learning assistance to the learner based on the objective of the assessment, the learner's mastery of the first knowledge point, and the learner's mastery status of the learning objective, comprising:
  a) generating, with the server, reports corresponding to the learner's performance on the assessment;
  b) generating, with the server, reports to (i) identify the learner's mastery status of the learning objective, (ii) identify the learner's deficiency in the third knowledge point, and (iii) identify that the learner's deficiency in mastering the first knowledge point and not the second knowledge point is the root cause of the learner's deficiency in the third knowledge point; and
  c) providing, with the server, step-by-step personalized remediation guides based on the learner's latest mastery status of the learning objective, the objective of the assessment, the learner's mastery of the first knowledge point, and one or more pedagogic categories.

15. The method of claim 1, wherein providing learning assistance personalized for the learner based on the objective of the assessment, the learner's mastery of the first knowledge point or the second knowledge point, and the learner's mastery status, comprising:
  a) providing, with the server, tools for selecting curriculum content, assessments, and assessment items to identify one or more of the plurality of knowledge points for self-study;
  b) generating, with the server, personalized self-study guides based on a learning priority, the learner's mastery status of the learning objective, and relevant learning resources;
  c) analyzing, on the server, results from a self-practice assessment completed by the learner; and
  d) updating the learner's mastery status for the learning objective with the results from the self-practice assessment, the learner's historical assessment performance corresponding to the learning objective; and the learner's historical mastery status for the learning objective.

16. A system for knowledge diagnosis and tutoring based on knowledge prerequisite relationship of a curriculum for one or more learning management systems, comprising:
  a computing device having an input for entry of information, a readable memory for storing information and programs, a CPU for executing programs, a device for connecting to wired or wireless network to interact with requests from users and other learning management systems, wherein the readable memory having stored therein a plurality of instructions that, in response to be in executed by the CPU, result in the computing device:
a) applying a curriculum framework and assessment framework to a curriculum, the curriculum including a learning objective to be measured, the learning objective comprising a plurality of knowledge points to be mastered by a learner;
b) determining that mastery of a first knowledge point and mastery of a second knowledge point of the learning objective are each prerequisites to mastery of a third knowledge point of the learning objective, wherein mastery of the first and second knowledge points are not prerequisites to mastery of each other;
c) parsing an assessment to be completed by the learner, the assessment comprising a plurality of assessment items that tests the learner's mastery status of the learning objective;
d) identifying an objective of the assessment, the objective of the assessment corresponding to one or more of the plurality of knowledge points to be mastered by the learner;
e) identifying that a particular assessment item of the plurality of assessment items tests the learner's mastery of the third knowledge point;
f) identifying that the first and second knowledge points are required to solve the particular assessment item that tests the learner's mastery of the third knowledge point;
g) providing pre-assessment learning assistance to the learner based on the objective of the assessment, the learner's mastery of the first and second knowledge points, and the learner's mastery status of the learning objective;
h) evaluating the learner's performance on the particular assessment item tested on the assessment;
i) identifying a first statistical distribution for the particular assessment item indicative of a probability that the learner's deficiency in mastery of the first knowledge point is a potential root cause of the learner's failure on the assessment item that tests the learner's mastery of the third knowledge point;
j) identifying a second statistical distribution for the particular assessment item indicative of the probability that the learner's deficiency in mastery of the second knowledge point is the potential root cause of the learner's failure on the assessment item that tests the learner's mastery of the third knowledge point;
k) determining, as a function of the first and second statistical distributions for the particular assessment item, that the learner's deficiency in mastery of the first knowledge point and not the second knowledge point is the root cause of the learner's failure on the assessment item that tests the learner's mastery of the third knowledge point;
l) updating the learner's mastery status for the learning objective based on the objective of the assessment, the learner's mastery of the first and second knowledge points, the learner's performance on the particular assessment item on the assessment, and a historical mastery status of the learner for the learning objective;
m) providing post-assessment remediation learning assistance to the learner based on the objective of the assessment, the learner's mastery of the first knowledge point, and the learner's mastery status of the learning objective; and
n) providing learning assistance personalized for the learner based on the objective of the assessment, the learner's mastery of the first knowledge point or the second knowledge point, and the learner's mastery status of the learning objective.

17. The system of claim 16, wherein applying a curriculum framework and an assessment framework to a curriculum, comprising:
a) applying the curriculum framework to the curriculum according to a content taxonomy, a pedagogic taxonomy, and other related taxonomies to the curriculum, the pedagogic taxonomy comprising one or more learning resources corresponding to the curriculum;
b) inputting curriculum data into a curriculum repository;
c) applying the assessment framework to the curriculum based on the curriculum framework to represent learning objectives and requirements of the curriculum; and
d) inputting assessment and prerequisite data into the curriculum repository.

18. The system of claim 17, wherein the content taxonomy comprising a set of hierarchical categories to represent the content structure of the plurality of knowledge points of the curriculum, each category of the content taxonomy associated with one or more terms; wherein the pedagogic taxonomy comprising a set of hierarchical categories to describe pedagogic attributes of the plurality of knowledge points, the learning resources, and the plurality of assessment items of the curriculum, each category of the pedagogic taxonomy associated with one or more terms; and
wherein the other related taxonomies comprising at least one of a desired and suitable learning preference taxonomy to define learning priorities, a semantic taxonomy to facilitate searching functionalities, and a learning resource taxonomy to classify learning resources.

19. The system of claim 17, wherein applying the curriculum framework according to a context taxonomy, a pedagogic taxonomy, and other related taxonomies, comprising:
a) assigning content of the curriculum with a hierarchical structure according to the content taxonomy of the curriculum;
b) associating each knowledge point of the plurality of knowledge points of the curriculum with the one or more learning resources corresponding to the curriculum; and
c) assigning relevant taxonomy categories and terms to the plurality of knowledge points of the curriculum and the one or more learning resources corresponding to the curriculum.

20. The system of claim 19, wherein assigning content of the curriculum with a hierarchical structure according to the content taxonomy of the curriculum, comprising:
a) assigning a learning objective of curriculum to curriculum content segments, each curriculum content segment comprising observable learner behavior or learner performance used to make judgments about the learner's learning progress in the curriculum; and
b) assigning each of the knowledge points of the curriculum to curriculum content segments that are sub-segments of the learning objective, each sub-segment represents a minimum measurable learning behavior and level of performance in the curriculum.

21. The system of claim 19, wherein associating each knowledge point of the plurality of knowledge points of the curriculum with the one or more learning resources corresponding to the curriculum comprising associating each knowledge point of the plurality of knowledge points with the one or more learning resources corresponding to the curriculum regardless of their media format and presentation environment.

22. The system of claim 19, wherein assigning relevant taxonomy categories and terms to the plurality of knowledge points of the curriculum and the one or more learning resources corresponding to the curriculum comprising associating each knowledge point of the plurality of knowledge points and each learning resource of the one or more learning resources with one or more pedagogic categories and terms and one or more categories and terms from at least one of a learning preference taxonomy, a semantic taxonomy, and a learning resource taxonomy of the curriculum.

23. The system of claim 16, wherein applying the assessment framework to the curriculum, comprising:
   a) identifying a prerequisite knowledge point and a prerequisite distribution for each knowledge point of the plurality of knowledge points of the curriculum;
   b) identifying an objective knowledge point and an objective scalar for each assessment item on the assessment;
   c) identifying a prerequisite knowledge point and a prerequisite distribution for each assessment item of the curriculum; and
   d) identifying one or more categories and terms for at least one of the pedagogic taxonomy, a semantic taxonomy, and a learning preference taxonomy for each assessment item on the assessment.

24. The system of claim 23, wherein identifying a prerequisite knowledge point and a knowledge prerequisite distribution for each knowledge point of the plurality of knowledge points of the curriculum, comprising:
   a) identifying a relationship between a pair of knowledge points that explicitly requires mastery of one knowledge point in the pair to master the other knowledge point in the pair; and
   b) identifying a statistical distribution corresponding to the relevance of the learner's deficiency in mastering one knowledge point in the pair of knowledge points.

25. The system of claim 23, wherein identifying an objective knowledge point and an objective scalar for each assessment item on the assessment, comprising identifying a scalar between 0 and 1 for the objective knowledge point for the assessment item to describe the relevance of the assessment item in testing the learner's mastery of the knowledge point.

26. The system of claim 16, wherein the plurality instructions further result in the computing device:
   a) providing a customizable curriculum framework a customizable assessment framework that supports customizing teaching content, learning resources, and assessment items;
   b) generating a study guide as teaching and review plan, the study guide comprises step-by-step study plans, relevant learning resources, learning priorities, the learner's mastery status of the learning objective, and one or more pedagogic categories;
   c) determining the learner's progress in the curriculum; and
   d) generating reports of the learner's mastery status in the curriculum and the learner's deficiency in mastering one or more knowledge points.

27. The system of claim 16, wherein providing pre-assessment learning assistance to the learner based on the objective of the assessment, the learner's mastery of the first and second knowledge points, and the learner's mastery status of the learning objective, comprising:
   a) generating a study guide based on the objective of the assessment and the learner's mastery of the first and second knowledge points, the study guide comprising step-by-step study plans, learning priorities, the learner's mastery status of the learning objective, relevant learning resources, and one or more pedagogic categories; and
   b) generating reports of the learner's mastery status of the learning objective and the learner's deficiency in mastering one or more knowledge points.

28. The system of claim 16, wherein evaluating the learner's performance on the particular assessment item tested on the assessment and updating the learner's mastery status based on the objective of the assessment, the learner's mastery of the first and second knowledge points, the learner's performance on the particular assessment item on the assessment, and a historical mastery status of the learner for the learning objective, comprising:
   a) calculating an assessment objective value for the learner for the third knowledge point;
   b) calculating an assessment prerequisite value for the learner for each of the first and second knowledge points;
   c) calculating a deficiency value for the learner corresponding to the third knowledge point;
   d) calculating an adjusted objective value for the third knowledge point and an adjusted prerequisite value for each of the first and second knowledge points based on the learner's historical assessment performance corresponding to the first, second, and third knowledge points;
   e) calculating an exponential knowledge score for the learner based on the adjusted objective value of the third knowledge point and the adjusted objective prerequisite value of each of the first and second knowledge points;
   f) calculating a learning score and an application score for the learner based on determining that mastery of the first and second knowledge points of the learning objective is required to master the third knowledge point, and a historical mastery status of the learner for the learning objective; and
   g) calculating the learner's mastery status based on the learning score and the application score.

29. The system of claim 16, wherein providing post-assessment remediation learning assistance to the learner based on the objective of the assessment, the learner's mastery of the first knowledge point, and the learner's mastery status of the learning objective, comprising:
   a) generating reports corresponding to the learner's performance on the assessment;
   b) generating reports to (i) identify the learner's mastery status of the learning objective, (ii) identify the learner's deficiency in the third knowledge point, and (iii) identify that the learner's deficiency in mastering the first knowledge point and not the second knowledge point is the root cause of the learner's deficiency in the third knowledge point; and
   c) providing step-by-step personalized remediation guides based on the learner's latest mastery status of the learning objective, the objective of the assessment, the learner's mastery of the first knowledge point, and one or more pedagogic categories.

30. The system of claim 16, wherein providing learning assistance personalized for the learner based on the objective of the assessment, the learner's mastery of the first knowledge point or the second knowledge point, and the learner's mastery status, comprising:

a) providing, tools for selecting curriculum content, assessments, and assessment items to identify one or more of the plurality of knowledge points for self-study;
b) generating, personalized self-study guides based on a learning priority, the learner's mastery status of the learning objective, and relevant learning resources;
c) analyzing, results from a self-practice assessment completed by the learner; and
d) updating the learner's mastery status for the learning objective with the results from the self-practice assessment, the learner's historical assessment performance corresponding to the learning objective; and the learner's historical mastery status for the learning objective.

31. A method for knowledge diagnosis and tutoring based on knowledge prerequisite relationships of a curriculum, comprising:
a) applying, on a server, a curriculum framework and an assessment framework to a curriculum, the curriculum including a learning objective to be measured, the learning objective comprising a plurality of knowledge points to be mastered by a learner;
b) determining, with the server, that mastery of a first knowledge point and mastery of a second knowledge point are each prerequisites to mastery of a third knowledge point, wherein the first and third knowledge points corresponding to a first curriculum and the second knowledge point corresponding to a second curriculum, and wherein mastery of the first and second knowledge points are not prerequisites to mastery of each other;
c) parsing, with the server, an assessment to be completed by the learner, the assessment comprising a plurality of assessment items that tests the learner's mastery status of the learning objective;
d) identifying an objective of the assessment, the objective of the assessment corresponding to one or more of the plurality of knowledge points to be mastered by the learner;
e) identifying, with the server, that a particular assessment item of the plurality of assessment items tests the learner's mastery of the third knowledge point;
f) identifying, with the server, that the first and second knowledge points are required to solve the particular assessment item that tests the learner's mastery of the third knowledge point;
g) providing, with the server, pre-assessment learning assistance to the learner based on the objective of the assessment, the learner's mastery of the first and second knowledge points, and the learner's mastery status of the learning objective;
h) evaluating the learner's performance on the particular assessment item tested on the assessment;
i) identifying a first statistical distribution for the particular assessment item indicative of a probability that the learner's deficiency in mastery of the first knowledge point is a potential root cause of the learner's failure on the assessment item that tests the learner's mastery of the third knowledge point;
j) identifying a second statistical distribution for the particular assessment item indicative of the probability that the learner's deficiency in mastery of the second knowledge point is the potential root cause of the learner's failure on the assessment item that tests the learner's mastery of the third knowledge point;
k) determining, as a function of the first and second statistical distributions for the particular assessment item, that the learner's deficiency in mastery of the first knowledge point and not the second knowledge point is the root cause of the learner's failure on the assessment item that tests the learner's mastery of the third knowledge point;
l) updating the learner's mastery status for the learning objective based on the objective of the assessment, the learner's mastery of the first and second knowledge points, the learner's performance on the particular assessment item on the assessment, and a historical mastery status of the learner for the learning objective;
m) providing, with the server, post-assessment remediation learning assistance to the learner based on the objective of the assessment, the learner's mastery of the first knowledge point, and the learner's mastery status of the learning objective; and
n) providing, with the server, learning assistance personalized for the learner based on the objective of the assessment, the learner's mastery of the first knowledge point or the second knowledge point, and the learner's mastery status of the learning objective.

32. The method of claim 31, wherein evaluating the learner's performance on the particular assessment item tested on the assessment and updating the learner's mastery status based on the objective of the assessment, the learner's mastery of the first and second knowledge points, the learner's performance on the particular assessment item on the assessment, and a historical mastery status of the learner for the learning objective, comprising:
a) calculating an assessment objective value for the learner for the third knowledge point;
b) calculating an assessment prerequisite value for the learner for each of the first and second knowledge points;
c) calculating a deficiency value for the learner corresponding to the third knowledge point;
d) calculating an adjusted objective value for the third knowledge point and an adjusted prerequisite value for each of the first and second knowledge points based on the learner's historical assessment performance corresponding to the first, second, and third knowledge points;
e) calculating an exponential knowledge score for the learner based on the adjusted objective value of the third knowledge point and the adjusted objective prerequisite value of each of the first and second knowledge points;
f) calculating a learning score and an application score for the learner based on determining that mastery of the first and second knowledge points of the learning objective is required to master the third knowledge point, and a historical mastery status of the learner for the learning objective; and
g) calculating the learner's mastery status based on the learning score and the application score.

* * * * *